US012719184B2

(12) United States Patent
Shiina

(10) Patent No.: US 12,719,184 B2
(45) Date of Patent: Aug. 25, 2026

(54) CONNECTOR WITH CABLE LOCATOR MOVABLY ATTACHED TO THE SHELL

(71) Applicant: Japan Aviation Electronics Industry, Limited, Tokyo (JP)

(72) Inventor: Tetsuya Shiina, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 338 days.

(21) Appl. No.: 18/614,948

(22) Filed: Mar. 25, 2024

(65) Prior Publication Data

US 2024/0396234 A1 Nov. 28, 2024

(30) Foreign Application Priority Data

May 23, 2023 (JP) ................................ 2023-084506

(51) Int. Cl.
*H01R 4/2429* (2018.01)
*H01R 4/2433* (2018.01)

(52) U.S. Cl.
CPC ......... *H01R 4/2429* (2013.01); *H01R 4/2433* (2013.01)

(58) Field of Classification Search
CPC .. H01R 4/2429; H01R 4/2433; H01R 13/631; H01R 13/02
See application file for complete search history.

(56) References Cited

U.S. PATENT DOCUMENTS

| | | | | |
|---|---|---|---|---|
| 5,562,480 A * | 10/1996 | Drewanz | H01R 4/2433 | 439/417 |
| 7,156,688 B2 * | 1/2007 | Nakano | H01R 4/2433 | 439/417 |
| 8,052,461 B2 | 11/2011 | Wang | | |
| 10,965,054 B2 * | 3/2021 | Naganuma | H01R 13/506 | |
| 12,469,988 B2 * | 11/2025 | Martin | H01R 4/2433 | |

(Continued)

FOREIGN PATENT DOCUMENTS

| | | | |
|---|---|---|---|
| CA | 2 275 923 C | 12/2006 | |
| EP | 1020964 A1 * | 7/2000 | H01R 13/6464 |
| JP | 2002-151169 A | 5/2002 | |

(Continued)

OTHER PUBLICATIONS

Extended European Search Report of Application No. 24166541.3, Dated Oct. 9, 2024.

*Primary Examiner* — Travis S Chambers
(74) *Attorney, Agent, or Firm* — Collard & Roe, P.C.

(57) ABSTRACT

Each of shell sidewall portions of a connector is provided with a first hole and a second hole which correspond to a locator. The locator is attached to a shell so that the locator is movable from a first position to a second position in a first direction. The locator is provided with receiving holes which receive ends of electric wires of a cable. The locator is provided with admitting portions communicating with the receiving holes. The admitting portions allow connection portions of terminals of to be moved. When the locator is positioned at the first position, each of protrusions of the locator is positioned in the first hole. When the locator is positioned at the second position, each protrusion is positioned in the second hole. When the locator is positioned at the second position, the connection portions corresponding to the locator are partly positioned in the receiving holes.

12 Claims, 20 Drawing Sheets

(56) References Cited

U.S. PATENT DOCUMENTS

2024/0283208 A1* 8/2024 Semilia .................. H01R 43/26

FOREIGN PATENT DOCUMENTS

| | | | |
|---|---|---|---|
| JP | 2006-236855 | A | 9/2006 |
| JP | 2019-021462 | A | 2/2019 |
| JP | 2022-103737 | A | 7/2022 |
| JP | 2022-185598 | A | 12/2022 |

* cited by examiner

CONNECTOR WITH CABLE LOCATOR MOVABLY ATTACHED TO THE SHELL

CROSS REFERENCE TO RELATED APPLICATIONS

This application is based on and claims priority under 35 U.S.C. § 119 to Japanese Patent Application No. JP2023-084506 filed May 23, 2023, the contents of which are incorporated herein in their entirety by reference.

BACKGROUND OF THE INVENTION

This invention relates to a connector which connects cables to each other.

JPA2006-236855 (Patent Document 1) discloses a connector for insulation displacement connection.

Referring to FIG. 31, a connector 90 of Patent Document 1 is provided with an electric wire holding block (or a locator) 92 and a contact block (or a housing) 94. The contact block 94 holds insulation displacement connection terminals (not shown) which protrude into a receiving portion (not shown) which receives the electric wire holding block 92. The electric wire holding block 92 is formed with holding holes (not shown) which hold electric wires 96, respectively, and receiving grooves (not shown) which receive the insulation displacement connection terminals.

As understood from FIG. 31, by inserting end portions of the electric wires 96 into the holding holes (not shown) of the electric wire holding block 92 and then by pushing the electric wire holding block 92 into the receiving portion (not shown) of the contact block 94, the electric wires 96 are electrically connected to the insulation displacement connection terminals (not shown).

SUMMARY OF THE INVENTION

The connector 90 of Patent Document 1 is provided with the electric wire holding block or locator 92. By using the electric wire holding block 92, a connection process for connecting the electric wires 96 to the insulation displacement connection terminals (not shown) of the connector 90 can be easily carried out. There is a demand to realize easiness of such connection process also in a connection process for connecting electric wires to each other.

It is an object of the present invention to provide a connector which can easily connect electric wires to each other with a simple structure thereof.

One aspect of the present invention provides a connector which connects cables to each other. The connector comprises a housing, at least one terminal, a shell and at least one locator. Each of the cables comprises at least one electric wire. The terminal has at least two connection portions. The connection portions are respectively connected to the electric wires of the cables. The shell has two shell sidewall portions which are apart from each other in a width direction. Each of the shell sidewall portions is provided with at least one set of a first hole and a second hole corresponding to the locator. The first hole and the second hole of the one set pierce the shell sidewall portion in the width direction and are apart from each other in a first direction perpendicular to the width direction. The locator is attached to the shell so that the locator is movable from a first position to a second position in the first direction. The locator corresponds to at least one of the cables and to the connection portion connected to the electric wire of the cable corresponding thereto. The locator is provided with a first end face, a second end face, a receiving hole, an admitting portion and two protrusions. The first end face and the second end face are located at both ends of the locator in a second direction, which is perpendicular to the width direction and intersects with the first direction. The receiving hole pierces the locator from the second end face to the first end face and is receivable an end of the electric wire of the cable corresponding to the locator. The admitting portion communicates with the receiving hole and allows the connection portion corresponding to the locator to be moved when the locator is moved. The protrusions correspond to the shell sidewall portions, respectively. Each of the protrusions protrudes outward in the width direction. When the locator is positioned at the first position, each of the protrusions is positioned in the first hole corresponding to the locator. When the locator is positioned at the second position, each of the protrusions is positioned in the second hole corresponding to the locator, and the connection portion corresponding to the locator is in the receiving hole in part.

The connector according to the above-mentioned aspect of this invention can easily connect the electric wire to the terminal with simple structure using the at least one locator attached to the shell thereof. Accordingly, it can be improved to handle the electric wires in connection therebetween.

An appreciation of the objectives of the present invention and a more complete understanding of its structure may be had by studying the following description of the preferred embodiment and by referring to the accompanying drawings.

Figure 1:
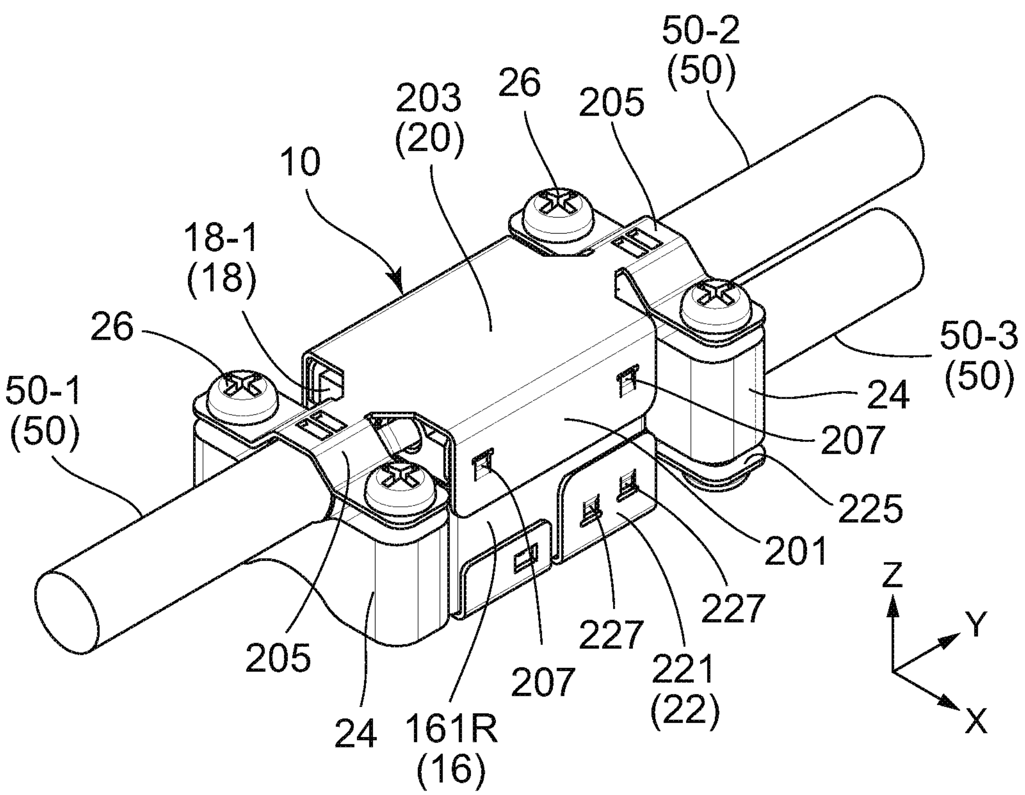
FIG. 1 is a perspective view showing an assembly of a connector according to a first embodiment of the present invention and cables. The connector connects three cables to one another.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

First Embodiment

As shown in FIG. 1, a connector 10 according to a first embodiment of the present invention is for connecting cables 50 to one another. In the present embodiment, the connector 10 connects three cables 50 to one another. However, the present invention is not limited thereto. The connector 10 of the present invention may connect two cables 50 to each other or connect four or more cables 50 to one another.

Figure 2:
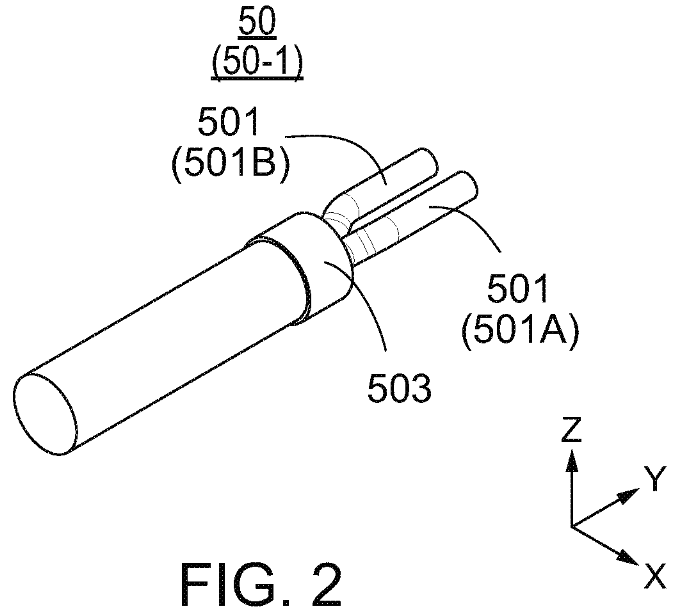
FIG. 2 is a perspective view showing one of the cables connected to the connector of FIG. 1.

As shown in FIG. 2, in the present embodiment, each of the cables 50 is a twisted pair cable provided with two electric wires 501, i.e. 501A and 501B. Moreover, in the present embodiment, each of the cables 50 has a shielding conductor 503. In other words, in the present embodiment, each of the cables 50 is a shielded twisted pair (STP) cable. In the present embodiment, the shielding conductor 503 is folded back at an end portion thereof. However, the present invention is not limited thereto. Each of the cables 50 may be an unshielded twisted pair (UTP) cable. Each of the cables 50 should be provided with at least one electric wire 501, and the connector 10 may be formed according to the number of the at least one electric wire 501. For example, the present invention is applicable to a connector for connecting coaxial cables to each other.

Figure 3:
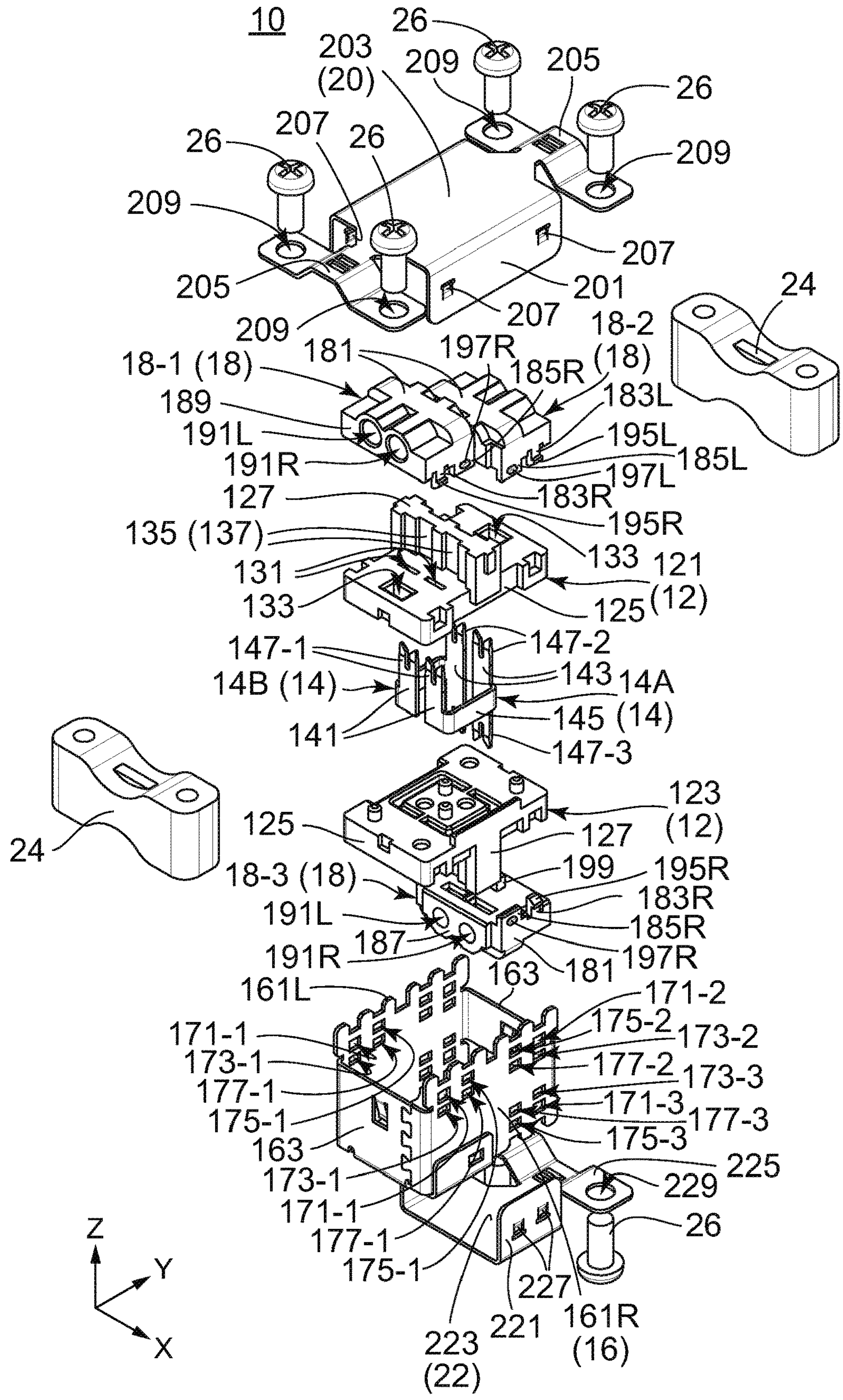
FIG. 3 is an exploded, perspective view showing the connector of FIG. 1.
Figure 4:
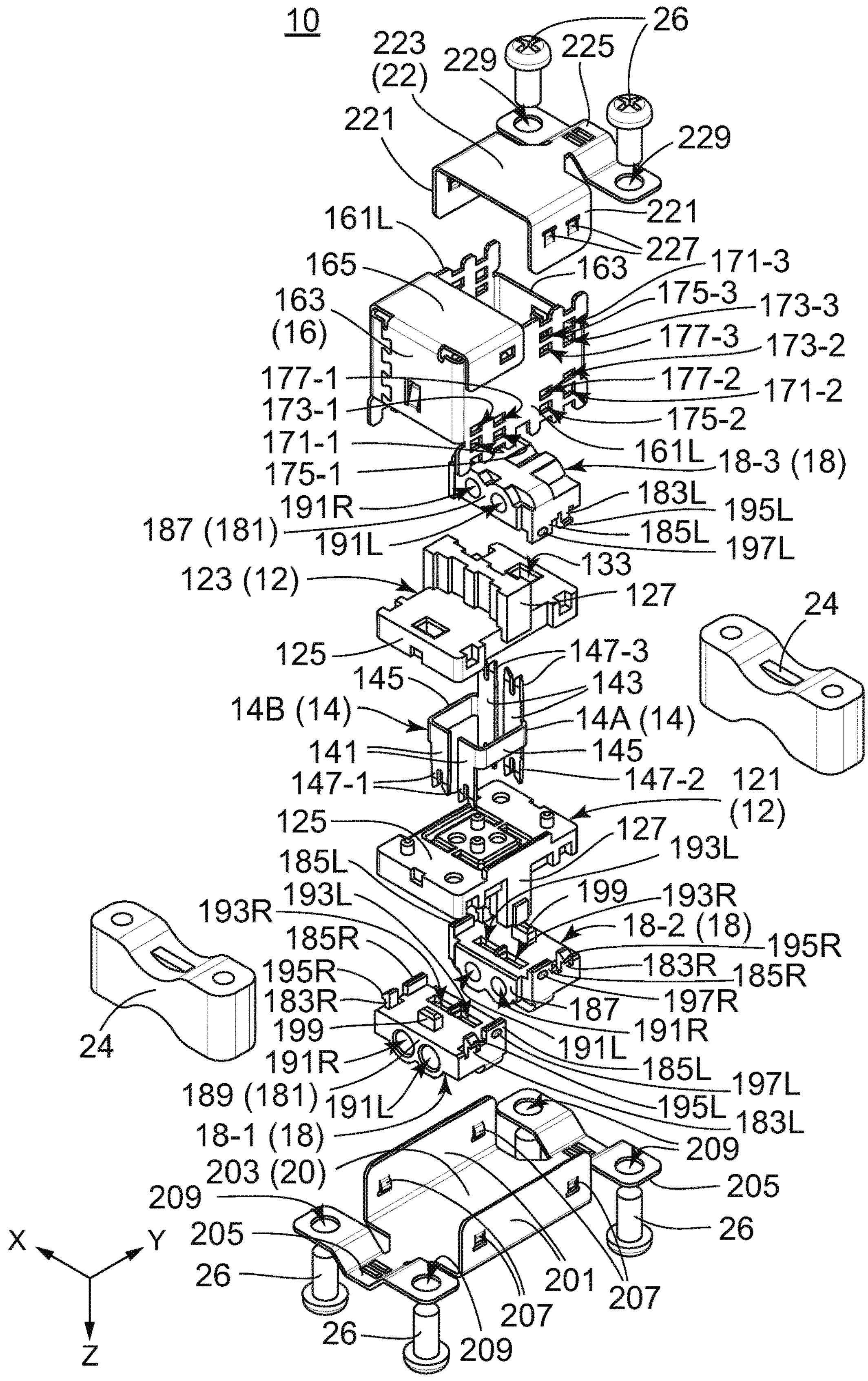
FIG. 4 is another exploded, perspective view showing the connector of FIG. 1.

Referring to FIGS. 3 and 4, the connector 10 is provided with a housing 12, at least one terminal 14, a shell 16 and at least one locator 18.

As shown in FIGS. 3 and 4, in the present embodiment, the housing 12 consists of two parts, i.e., an upper housing 121 and a lower housing 123. In the present embodiment, an up-down direction is a Z-direction. However, the present invention is not limited thereto. The housing 12 may consist of a single part.

As shown in FIGS. 3 and 4, in the present embodiment, the at least one terminal 14 is two in number. The number of the terminals 14 correspond to the number of the electric wires 501 included in each of the cables 50 (see FIG. 2). In other words, in the present embodiment, the connector 10 is provided with the two terminals 14, i.e., a first terminal 14A and a second terminal 14B, which respectively correspond to the two electric wires 501, i.e. 501A and 501B, of each of the cables 50. The two terminals 14 have shapes symmetrical to each other with respect to a plane perpendicular to a width direction and are arranged so that they are apart from each other in the width direction. In the present embodiment, the width direction is an X-direction. The two terminals 14 have the shapes symmetrical to each other, so that they have signal transmission path lengths equal to each other and transmission characteristics same as each other.

As understood from FIG. 3, the shell 16 has two shell sidewall portions 161, i.e. 161R and 161L, which are apart from each other in the width direction and two coupling wall portions 163 which couple the shell sidewall portions 161 to each other. As shown in FIG. 4, the shell 16 further has a bottom plate portion 165 covering a bottom of the shell 16 in part. In the present embodiment, the shell 16 is formed of a conductive metal sheet. However, the present invention is not limited thereto. The shell 16 may be made of resin. Nevertheless, it is preferable that the shell 16 is made of conductive metal in consideration of strength thereof and an electromagnetic shield effect thereof.

As shown in FIGS. 3 and 4, in the present embodiment, the at least one locator 18 is three in number. The locators 18 correspond to the cables 50, respectively. In other words, first, second and third locators 18-1, 18-2 and 18-3 correspond to first, second and third cables 50-1, 50-2 and 50-3, respectively. However, the present invention is not limited thereto. The number of the locators 18 may be fewer than the number of the cables 50. For example, the connector 10 may have one locator 18 corresponding to any one of the electric wires 501. Alternatively, one locator 18 may correspond to two or more cables 50. Nevertheless, that the locators 18 correspond to the cables 50 in a one-to-one relationship provides better operability.

As shown in FIGS. 3 and 4, the connector 10 further has an upper cover portion (a cover portion) 20, a lower cover portion 22, two fixing blocks 24 and a plurality of screws 26. The upper cover portion 20 is made of metal and provided with two cover sidewall portions 201, a coupling portion 203 and two attaching portions 205. The cover sidewall portions 201 are arranged apart from each other in the width direction. The coupling portion 203 couples the cover sidewall portions 201 to each other. The lower cover portion 22 is made of metal and provided with two cover sidewall portions 221 and a coupling portion 223. The cover sidewall portions 221 are arranged apart from each other in the width direction. The coupling portion 223 couples the cover sidewall portions 221 to each other. In the present invention, the cover portion 20, the fixing blocks 24 and the screws 26 are not essential. However, these hold the cables 50 (see FIG. 1) and cause an electromagnetic shield effect.

Figure 5:
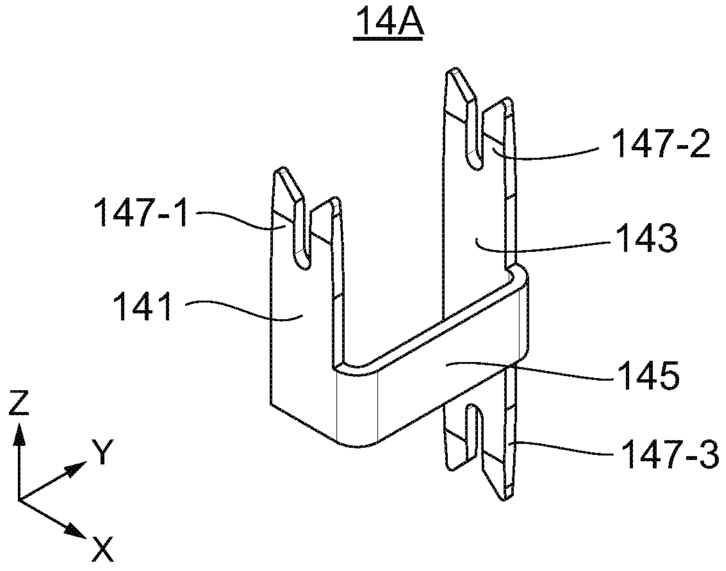
FIG. 5 is a perspective view showing one of terminals included in the connector of FIG. 1.

Referring to FIG. 5, the terminal 14A has a first portion 141 having a plate-like shape, a second portion 143 having a plate-like shape and a coupling portion 145 coupling the first portion 141 and the second portion 143 to each other. As mentioned above, the second terminal 14B has a shape symmetrical to that of the terminal 14A.

As shown in FIG. 5, the first portion 141 and the second portion 143 of the terminal 14A extend in a first direction perpendicular to the width direction. The first portion 141 and the second portion 143 are arranged apart from each other in a second direction, which is perpendicular to the width direction and intersects with the first direction, and arranged in parallel to each other. The coupling portion 145 couples one end portion of the first portion 141 to a middle portion of the second portion 143. In the present embodiment, the first direction is the Z-direction which is identical with the up-down direction. However, in the present invention, the first direction may be inclined to the up-down direction. Moreover, in the present embodiment, the second direction is a Y-direction perpendicular to the first direction. Hereinafter, in this description, the Y-direction may be referred to as a front-rear direction. A negative Y-direction may be referred to as a forward direction while a positive Y-direction may be referred to as a rearward direction.

As shown in FIG. 5, the other end portion of the first portion 141 of the first terminal 14A and both end portions of the second portion 143 of the terminal 14A are respectively provided with the connection portions 147, i.e., first, second and third connection portions 147-1, 147-2 and 147-3. The first connection portion 147-1 and the second connection portion 147-2 are arranged so that their projections are identical to each other in the second direction. The second connection portion 147-2 and the third connection portion 147-3 have shapes symmetrical to each other in the first direction.

As understood from FIGS. 3 and 4, the connection portions 147 respectively correspond to the cables 50. Moreover, each of the connection portions 147 of the first terminal 14A respectively correspond to the electric wire 501A which is one of the electric wires 501 of the cable 50 corresponding thereto. Thus, the connection portions 147-1, 147-2 and 147-3 of the first terminal 14A are respectively connected to the electric wires 501A of the cables 50-1, 50-2 and 50-3 which are different from one another. In the present embodiment, each of the connection portions 147 is an insulation displacement connection piece having a bifurcate shape and extending in the first direction. However, the present invention is not limited thereto. The shape of the terminal 14 and the shape of the connection portion 147 are not specifically limited. The number of the connection portions 147 of the terminal 14 depends on the number of the cables 50. The terminal 14 should have at least two connection portions 147.

Figure 6:
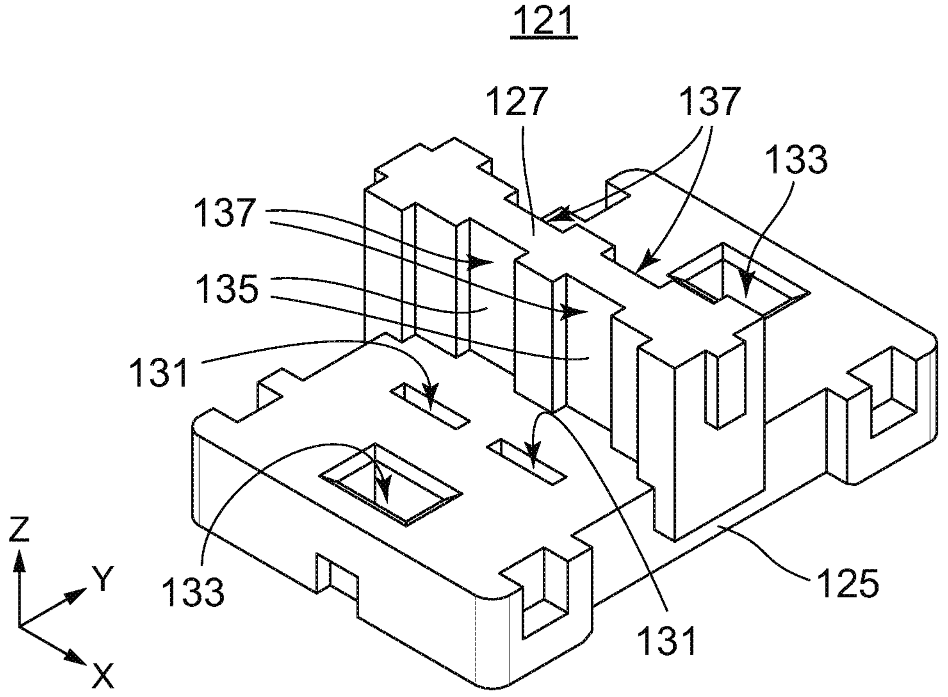
FIG. 6 is a perspective view showing an upper housing included in the connector of FIG. 1.

Referring to FIG. 6, the upper housing 121 has a base portion 125, which has a flat plate-like shape, and a middle wall 127, which protrudes upward from the base portion 125. In the present embodiment, the upper housing 121 has a shape which is rotationally symmetrical about a central axis extending along the up-down direction.

As shown in FIG. 6, the base portion 125 of the upper housing 121 is formed with a plurality of through holes 131 piercing it in the up-down direction. In the present embodiment, the through holes 131 are four in number. The through holes 131 correspond to the connection portions 147 of the terminals 14, respectively. In detail, the through holes 131 of the upper housing 121 respectively correspond to the first connection portion 147-1 of the first terminal 14A, the second connection portion 147-2 of the first terminal 14A, the first connection portion 147-1 of the second terminal 14B and the second connection portion 147-2 of the second terminal 14B. Each of the through holes 131 has a size into which the connection portion 147 is insertable.

As shown in FIG. 6, the base portion 125 is further formed with two guide portions 133. Each of the guide portions 133 is a recess recessed downward from an upper surface of the base portion 125.

As shown in FIG. 6, the middle wall 127 of the upper housing 121 has at least one receiving surface 135. In the present embodiment, the upper housing 121 has four receiving surfaces 135. Each of the receiving surfaces 135 corresponds to any one of the electric wires 501 of the cables 50. In the present embodiment, the receiving surfaces 135 are bottom surfaces of grooves 137 formed in the middle wall 127. Each of the grooves 137 is depressed toward the middle of the middle wall 127 in the front-rear direction and extends in the first direction. The bottom surfaces of the grooves 137 intersect with the second direction. Two of the receiving surfaces 135 are directed forward. The remaining two of the receiving surfaces 135 are directed rearward. Moreover, the receiving surfaces 135 correspond to the through holes 131, respectively. Each of the receiving surfaces 135 is aligned with the through hole 131 corresponding thereto in the front-rear direction.

As understood from FIGS. 3 and 4, the lower housing 123 has a shape which is generally identical to that of the upper housing 121 which is inverted. However, through holes 131 formed in the lower housing 123 are two in number. The through holes 131 respectively correspond to the third connection portion 147-3 of the first terminal 14A and the third connection portion 147-3 of the terminal 14B. However, the present invention is not limited thereto. The lower housing 123 may be formed so that it is identical to the upper housing 121.

As understood from FIGS. 3 and 4, the upper housing 121 and the lower housing 123 partly sandwich the terminals 14 and hold them. Each of the connection portions 147 of the terminals 14 passes through the through hole 131 corresponding thereto and is exposed outside.

Figure 7:
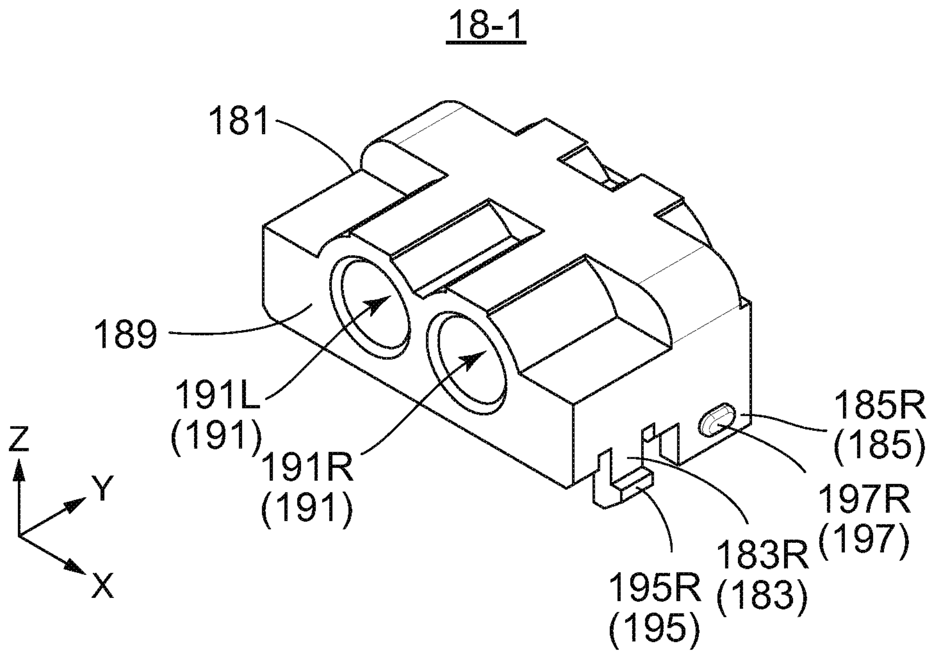
FIG. 7 is a perspective view showing one of locators included in the connector of FIG. 1.
Figure 8:
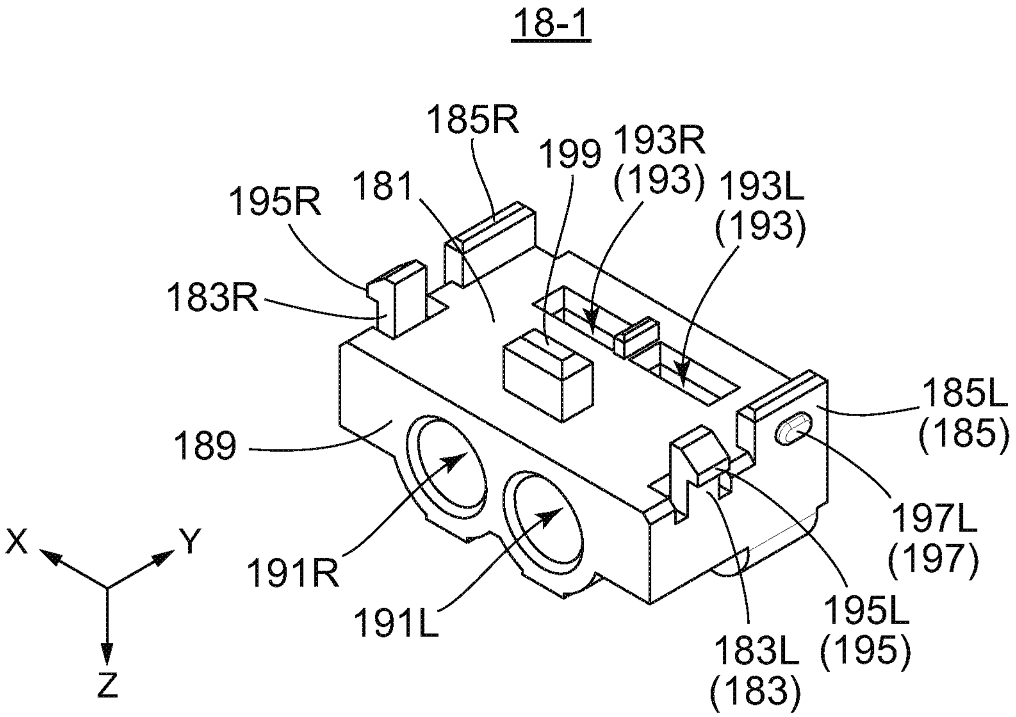
FIG. 8 is another perspective view showing the locator of FIG. 7.

Referring to FIGS. 7 and 8, the first locator 18-1 has a main portion 181 and two support portions 183, i.e. 183R and 183L. In the present embodiment, the first locator 18-1 further has two auxiliary portions 185, i.e. 185R and 185L. The support portions 183 are located at both sides of the main portion 181 in the width direction and extend from the main portion 181 in the first direction. Each of the support portions 183 is resiliently deformable, so that a tip thereof is movable at least in the width direction. The auxiliary portions 185R and 185L are located rearward of the support portions 183R and 183L, respectively, and extend from the main portion 181 in the first direction.

Referring to FIGS. 3 and 4 in addition to FIGS. 7 and 8, the main portion 181 of the first locator 18-1 is provided with a first end face 187 and a second end face 189. The first end face 187 and the second end face 189 are located at both ends of the first locator 18-1 in the second direction.

As shown in FIGS. 7 and 8, the main portion 181 of the first locator 18-1 is further formed with at least one receiving hole 191 and at least one admitting portion 193. In the present embodiment, the first locator 18-1 is formed with two receiving holes 191R and 191L and two admitting portions 193R and 193L. The receiving holes 191R and 191L correspond to the admitting portions 193R and 193L, respectively.

As understood from FIGS. 7 and 8, the receiving holes 191R and 191L of the first locator 18-1 respectively correspond to the electric wires 501A and 501B of the first cable 50-1 corresponding to the first locator 18-1. Each of the receiving holes 191R and 191L pierces the first locator 18-1 from the second end face 189 to the first end face 187, so that it can receive an end portion of the electric wire 501A or 501B corresponding thereto. In other words, each of the receiving holes 191R and 191L has a size which can receive the end portion of the electric wire 501A or 501B.

As understood from FIGS. 3 and 4, the admitting portions 193R and 193L of the first locator 18-1 correspond to the terminals 14A and 14B, respectively. In other words, the admitting portions 193R and 193L respectively correspond to the first connection portion 147-1 of the first terminal 14A and the first connection portion 147-1 of the second terminal 14B, which are connected to the electric wire 501A and 501B of the first cable 50-1 corresponding to the first locator 18-1. Moreover, each of the admitting portions 193R and 193L has a size which allows the connection portion 147 corresponding thereto to be moved in the first direction. In addition, each of the admitting portions 193R and 193L communicates with the receiving hole 191R or 191L corresponding thereto.

As shown in FIGS. 7 and 8, the first locator 18-1 is further provided with two protrusions 195, i.e. 195R and 195L. The support portions 183R and 183L of the first locator 18-1 correspond to the protrusions 195R and 195L, respectively. Each of the protrusions 195R and 195L is provided to an end portion of the support portion 183R or 183L correspond thereto. Moreover, the protrusions 195R and 195L respectively correspond to the shell sidewall portions 161R and 161L of the shell 16 and protrude outward in the width direction. The protrusions 195R and 195L are respectively supported by the support portions 183R and 183L, and they are movable at least in the width direction owing to resilient deformation of the support portions 183R and 183L.

As shown in FIGS. 7 and 8, the first locator 18-1 is further provided with two auxiliary protrusions 197, i.e. 197R and 197L. The auxiliary protrusions 197R and 197L are provided to the auxiliary portions 185R and 185L, respectively. The auxiliary protrusions 197R and 1971 protrude outward in the width direction. The auxiliary protrusions 197R and 197L are respectively located rearward of the protrusions 195 in the front-rear direction. Moreover, the auxiliary protrusions 197R and 197L are located at positions slightly nearer to the main portion 181 than the protrusions 195R and 195L in the first direction.

As shown in FIG. 8, the first locator 18-1 is further provided with a guided portion 199 extending in the first direction. The guided portion 199 protrudes downward from the main portion 181. The guided portion 199 corresponds to one of the guide portions 133 of the upper housing 121. The guide portion 133 receives the guided portion 199 corresponding thereto and guides a movement of the guided portion 199 or the first locator 18-1.

As understood from FIGS. 3 and 4, each of a second locator 18-2 and a third locator 18-3 is formed so that it is identical to the first locator 18-1. The admitting portions 193R and 193L of the second locator 18-2 respectively correspond to the second connection portion 147-2 of the first terminal 14A and the second connection portion 147-2 of the second terminal 14B which are connected to the electric wires 501A and 501B of the second cable 50-2 corresponding to the second locator 18-2. The admitting portions 193R and 193L of the third locator 18-3 respectively correspond to the third connection portion 147-3 of the first terminal 14A and the third connection portion 147-3 of the second terminal 14B which are connected to the electric wires 501A and 501B of the third cable 50-3 corresponding to the third locator 18-3.

Figure 9:
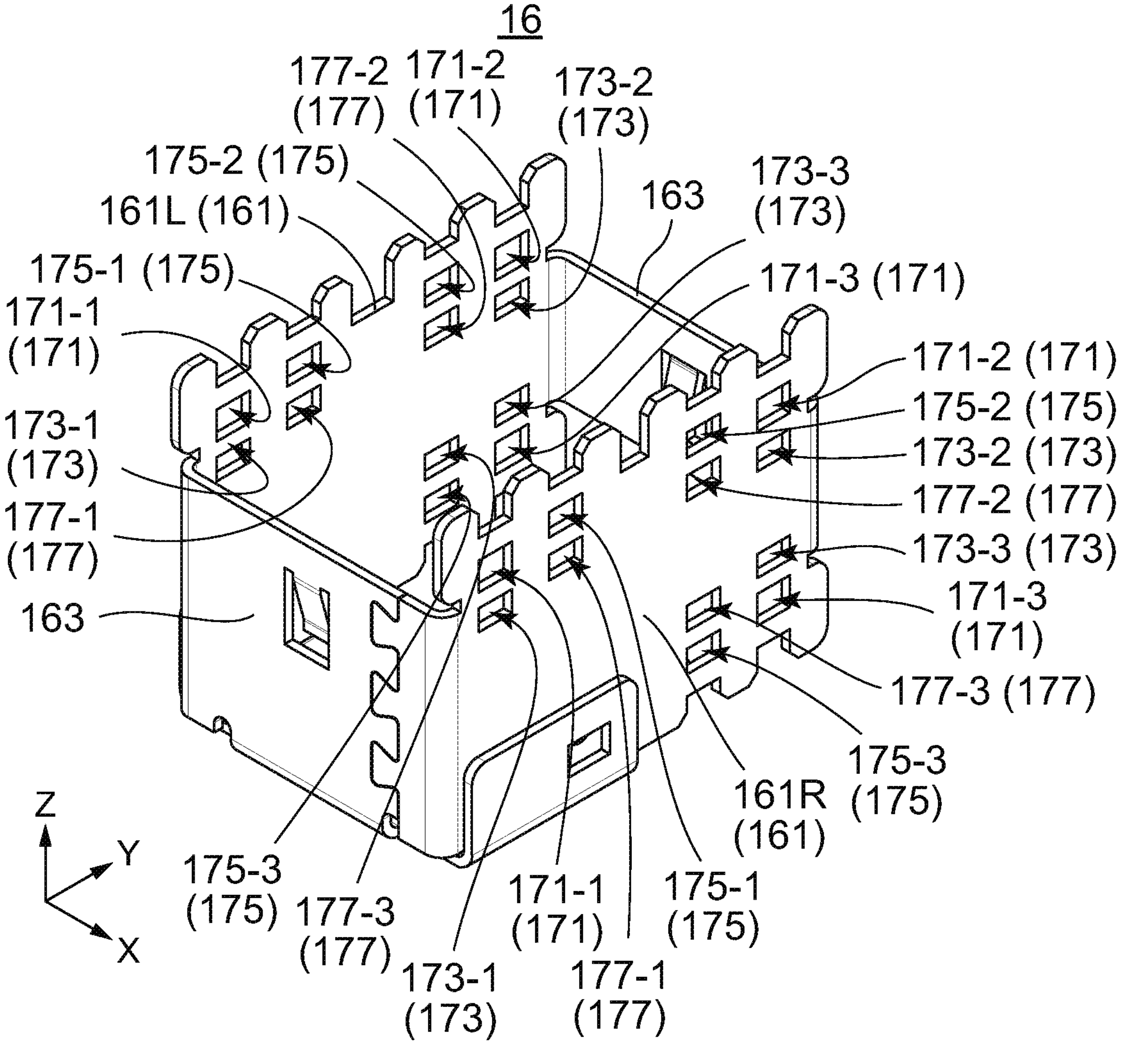
FIG. 9 is a perspective view showing a shell included in the connector of FIG. 1.

Referring to FIG. 9, each of the shell sidewall portions 161R and 161L of the shell 16 is provided with at least one set of a first hole 171 and a second hole 173, wherein the at least one set of the first hole 171 and the second hole 173 correspond to the at least one locator 18. In the present embodiment, each of the shell sidewall portions 161R and 161L is provided with three sets of the first holes 171, i.e. 171-1, 171-2 and 171-3, and the second holes 173, i.e. 173-1, 173-2 and 173-3. The first hole 171-1 and the second hole 173-1 correspond to the first locator 18-1. The first hole 171-2 and the second hole 173-2 correspond to the second locator 18-2. The first hole 171-3 and the second hole 173-3 correspond to the third locator 18-3.

As shown in FIG. 9, each of the shell sidewall portions 161R and 161L is further formed with at least one set of a third hole 175 and a fourth hole 177, wherein the at least one set of the third hole 175 and the fourth hole 177 correspond to the at least one locator 18. In the present embodiment, each of the shell sidewall portions 161R and 161L is formed with three sets of the third holes 175, i.e. 175-1, 175-2 and 175-3, and the fourth holes 177, i.e. 177-1, 177-2 and 177-3. The third hole 175-1 and the fourth hole 177-1 correspond to the first locator 18-1. The third hole 175-2 and the fourth hole 177-2 correspond to the second locator 18-2. The third hole 175-3 and the fourth hole 177-3 correspond to the third locator 18-3.

As understood from FIGS. 9, in each of the shell sidewall portions 161R and 161L, each of the first holes 171, i.e. 171-1, 171-2 and 171-3, and the second holes 173, i.e. 173-1, 173-2 and 173-3, pierces the shell sidewall portion 161R or 161L in the width direction. Moreover, in each of the sets of the first holes 171 and the second holes 173, the first hole 171 and the second hole 173 are located apart from each other in the first direction. Similarly, in each of the shell sidewall portions 161R and 161L, each of the third holes 175, i.e. 175-1, 175-2 and 175-3, and the fourth holes 177, i.e. 177-1, 177-2 and 177-3, pierces the shell sidewall portion 161R or 161L in the width direction. Moreover, in each of the sets of the first holes 171 and the second holes 173, the third hole 175 and the fourth hole 177 are located apart from each other in the first direction. In the present embodiment, in each of the sets of the first holes 171 and the second holes 173, the first hole 171 and the second hole 173 correspond to the protrusions 195R or 195L of the locator 18 corresponding thereto. Moreover, in the present embodiment, in each of the sets of the first holes 171 and the second holes 173, the third hole 175 and the fourth hole 177 correspond to the auxiliary protrusions 197R or 197L of the locator 18 corresponding thereto.

Figure 10:
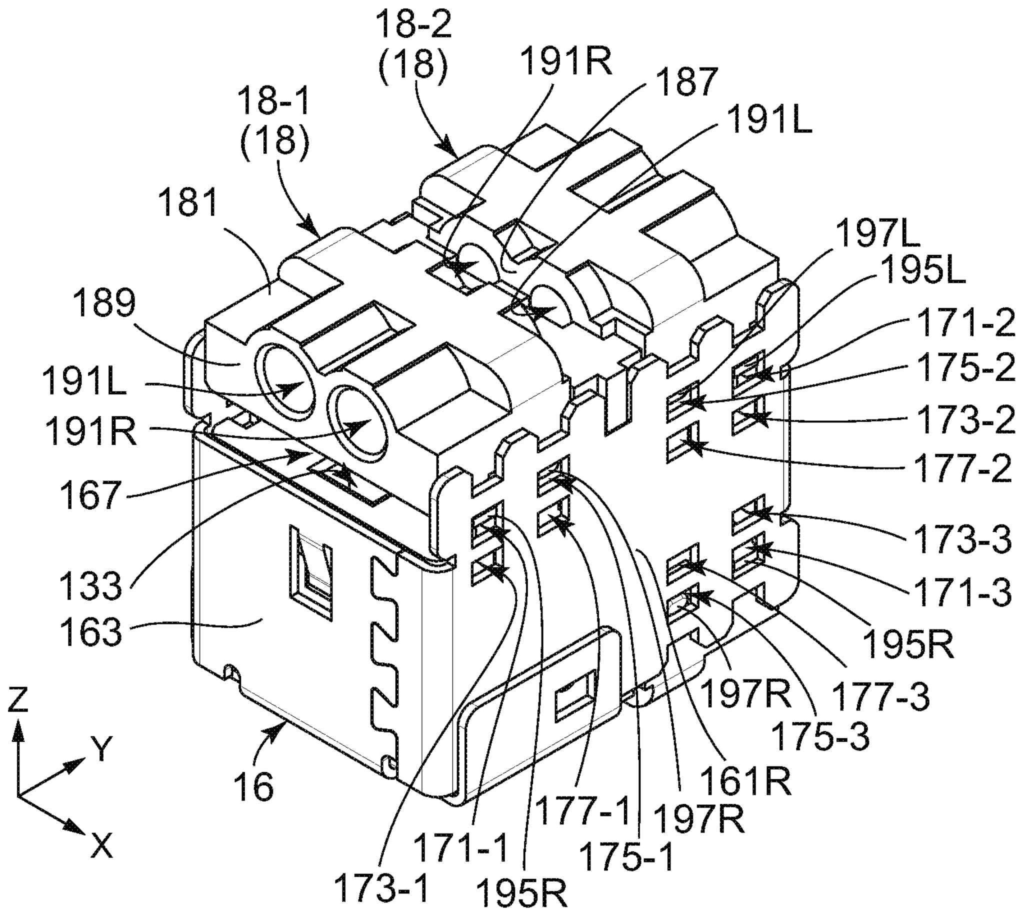
FIG. 10 is a perspective view showing a main portion of the connector of FIG. 1. Each of the locators is positioned at a first position.

As understood from FIGS. 3 and 10, the shell 16 can accommodate the housing 12, which holds the terminals 14, and the locators 18 in the inside thereof. In a state that the housing 12 is accommodated in the shell 16, the receiving surfaces 135 of the housing 12 and the shell sidewall portions 161R and 161L form accommodation portions 167 for accommodating the locators 18. In the present embodiment, the connector 10 is formed with three accommodation portions 167 (only one of which is shown), and the accommodation portions 167 correspond to the locators 18, respectively.

Referring to FIG. 10, each of the locators 18 is attached to the shell 16 and partly accommodated in the accommodation portion 167 corresponding thereto. In a state that the locator 18 is attached to the shell 16, the first end face 187 of the locator 18 is nearer to the receiving surfaces 135 of the housing 12 than the second end face 189 is in the second direction. In detail, the first end face 187 of the first locator 18-1 is directed rearward in the front-rear direction while the second end face 189 of the first locator 18-1 is directed forward in the front-rear direction. The first end face 187 of each of the second locator 18-2 and the third locator 18-3 is directed forward in the front-rear direction while the second end face 189 of each of the second locator 18-2 and the third locator 18-3 is directed rearward in the front-rear direction. Hereinafter, the description for the first locator 18-1 is applicable to the second locator 18-2 and the third locator 18-3 with the necessary modification. Similarly, the description for the second locator 18-2 is applicable to the first locator 18-1 and the third locator 18-3 with the necessary modification.

Figure 11:
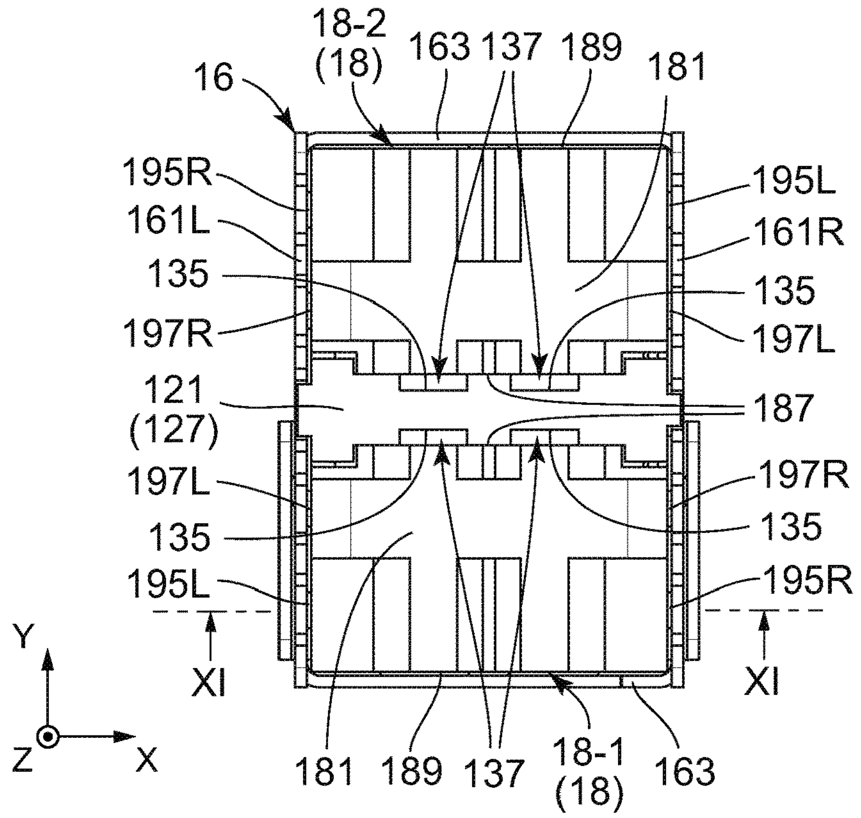
FIG. 11 is a top view showing the main portion of FIG. 9.

As understood from FIG. 11, a size of the main portion 181 of the first locator 18-1 is slightly smaller than an internal size of the shell 16 in the width direction. In addition, a total size of the locator 18 with the protrusions 195, i.e. 195R and 195L, is larger than the internal size of the shell 16 in the width direction.

As understood from FIGS. 3 and 10, attachment of the locator 18 to the shell 16 is carried out by pressing the locator 18 toward the accommodation portion 167 corresponding thereto along the first direction. As shown in FIGS. 7 and 8, a size of the protrusion 195, i.e. 195R or 195L, is reduced toward a tip thereof. Because of the shape of the protrusion 195, the attachment of the locator 18 to the shell 16 can be easily carried out. The protrusions 195 can enter the accommodation portions 167 mainly owing to resilient deformation of the support portions 183, and the auxiliary protrusions 197 can enter the accommodation portions 167 mainly owing to resilient deformation of the shell 16.

As understood from FIG. 10, when each of the protrusions 195, or 195R and 195L, which enters the accommodation portion 167, reaches the first hole 171 corresponding thereto, it enters the first hole 171 owing to reaction of the support portion 183. Moreover, when each of the auxiliary protrusions 197, i.e. 197R and 197L, which enters the accommodation portion 167, reaches the third hole 175 corresponding thereto, it enters the third hole 175 owing to reaction of the shell 16. Thus, when the locator 18 is attached to the shell 16, each of the protrusions 195 is positioned in the first hole 171 corresponding thereto while each of the auxiliary protrusions 197 is positioned in the third hole 175 corresponding thereto. In the following description, the position of the locator 18 at this time with respect to the shell 16 is referred to as a first position. In other words, in the present embodiment, when the locator 18 is positioned at the first position, each of the protrusions 195 is positioned in the first hole 171 corresponding to the locator 18 while each of the auxiliary protrusions 197 is positioned in the third hole 175.

Figure 12:
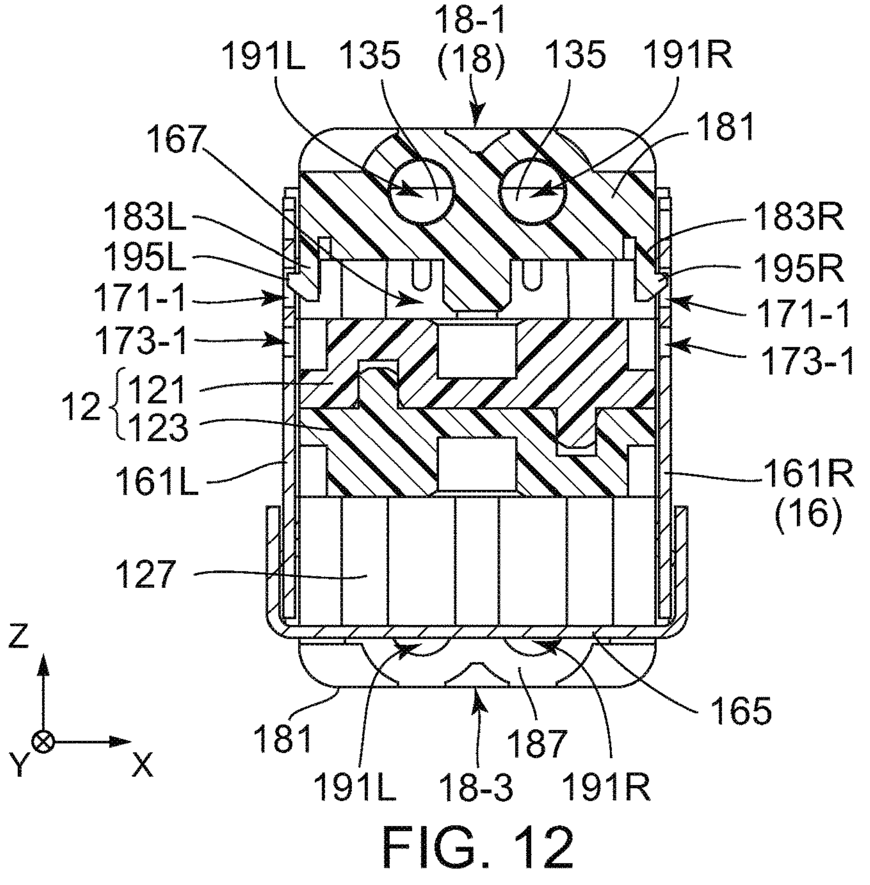
FIG. 12 is a longitudinal sectional view showing the main portion of FIG. 10, taken along line XI-XI.

Referring to FIG. 12, when the first locator 18-1 is positioned at the first position, each of the receiving surfaces 135 is visible through each of the receiving holes 191, i.e. 191R and 191L, thereof. In detail, when the first locator 18-1 is positioned at the first position, a part of a region occupied by each of the receiving holes 191 is included in a region occupied by the receiving surface 135 corresponding thereto in the first direction while a remaining part of the region occupied by the receiving hole 191 is out of the region occupied by the receiving surface 135 in the first direction. At this time, the connection portion 147 (see FIG. 13) corresponding to each of the receiving holes 191 is not visible in the receiving hole 191. In this state, each of the receiving holes 191 allows the end portion of the electric wire 501 corresponding thereto to be inserted therein and a tip of the electric wire 501 to be brought into abutment with the receiving surface 135. As just described, when the locator 18 is positioned at the first position, the tip of the electric wire 501 inserted into the receiving hole 191 can be brought into abutment with the receiving surface 135.

Figure 14:
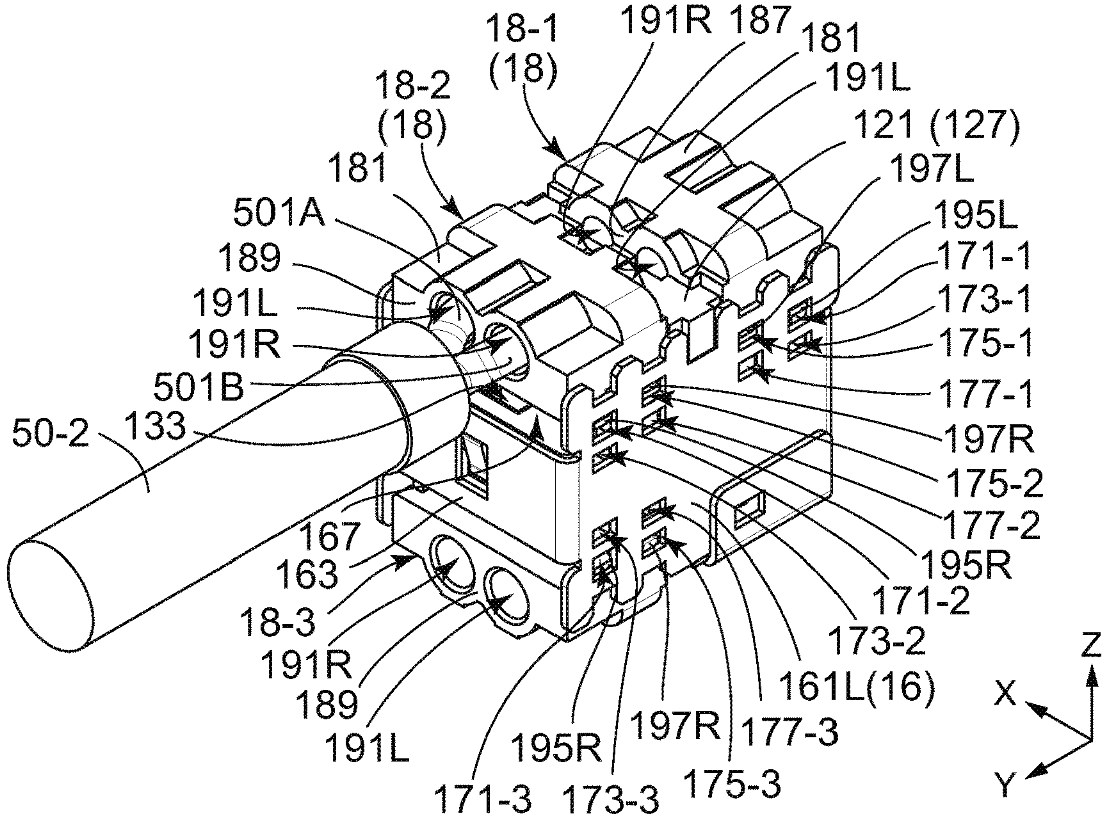
FIG. 14 is a perspective view showing the main portion of the connector of FIG. 1 and one of the cables. End portions of electric wires of the cable are inserted into receiving holes of a second locator, respectively. Each of the locators is positioned at the first position.
Figure 15:
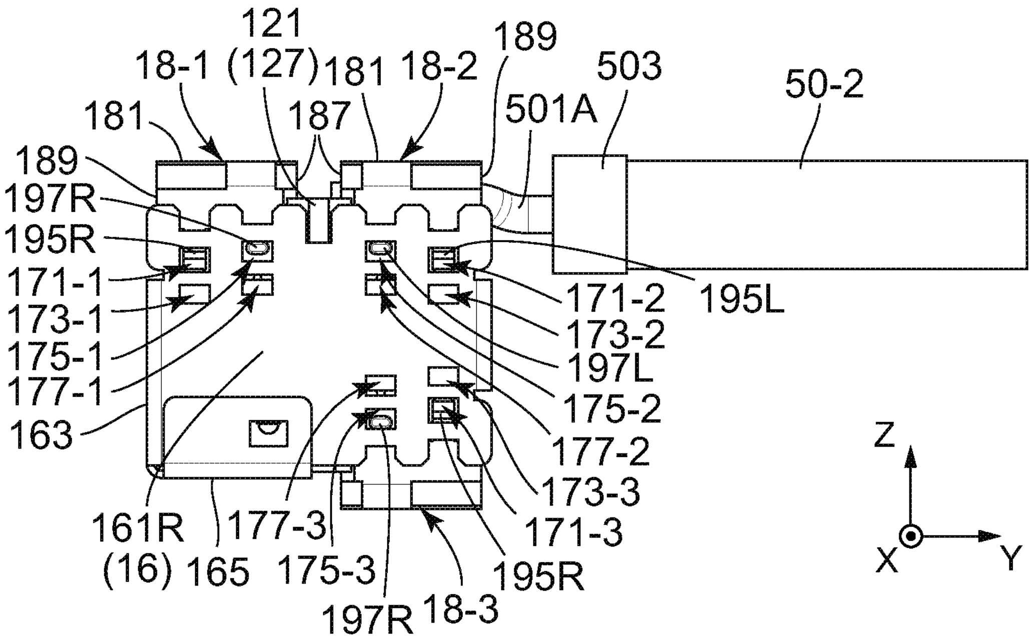
FIG. 15 is a side view showing the main portion and the cable of FIG. 14.
Figure 17:
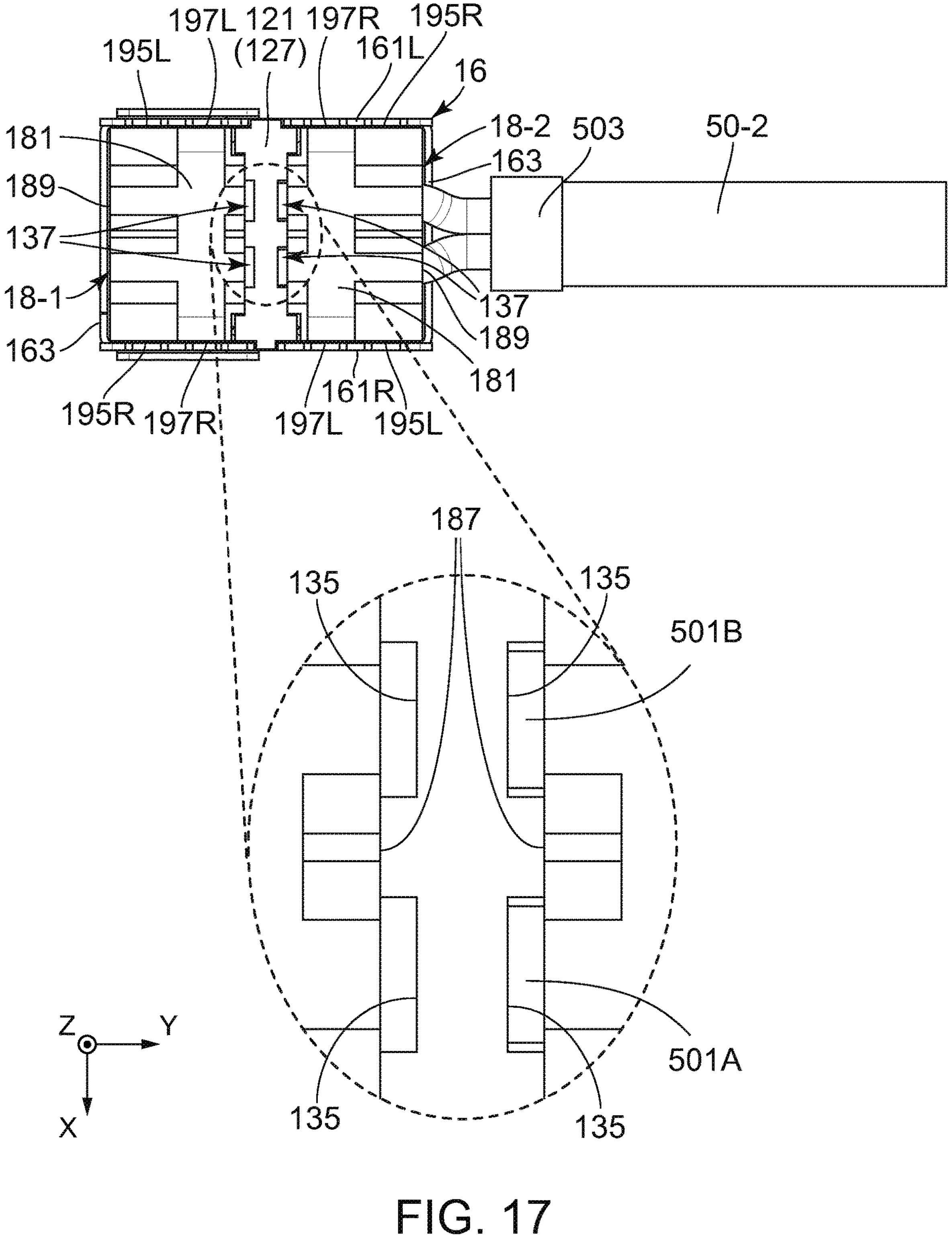
FIG. 17 is a top view showing the main portion and the cable of FIG. 14. Receiving surfaces and therearound are illustrated in an enlarged fashion.

Referring to FIGS. 14 and 15, the second locator 18-2 is positioned at the first position, and the electric wires 501, i.e. 501R and 501L, are inserted into the receiving holes 191, i.e. 191R and 191L, of the second locator 18-2, respectively. Here, as shown in FIG. 11, when the second locator 18-2 is attached to the shell 16, a gap remains between the first end face 187 of the second locator 18-2 and each of the receiving surfaces 135 of the upper housing 121 in the second direction. Accordingly, as shown in FIG. 17, the tips of the electric wires 501 of the second cable 50-2 are visible when viewed along the first direction, wherein the electric wires 501 are inserted in the receiving holes 191 of the second locator 18-2. Thus, it can be confirmed whether the tips of the electric wires 501 of the second cable 50-2 are brought into abutment with the receiving surfaces 135 or not, wherein the electric wires 501 are inserted in the receiving holes 191 of the second locator 18-2. With this structure, connections of the electric wires 501 to the connector 10 can be securely carried out.

As described above with reference to FIGS. 7 and 8, the size of the protrusion 195 in the width direction is reduced toward the tip thereof. According to this shape of the protrusion 195, when the locator 18 receives a force directed into the accommodation portion 167, the protrusion 195 positioned in the first hole 171 can easily come out from the first hole 171. In contrast, when the locator 18 receives a force directed outward of the accommodation portion 167, coming out of the protrusion 195 positioned in the first hole 171 from the first hole 171 is regulated. In other words, the protrusions 195 prevent the locator 18 attached to the shell 16 from falling away from the shell 16. Moreover, the auxiliary protrusion 197 is set in shape and in size so that it cannot come out from the third hole 175 when the locator 18 receives a relatively small force and so that it can come out from the third hole 175 when the locator 18 receives a relatively large force. It also depends on a shape and a position of the protrusion 195 whether the auxiliary protrusion 197 can come out from the third hole 175 or not.

Figure 13:
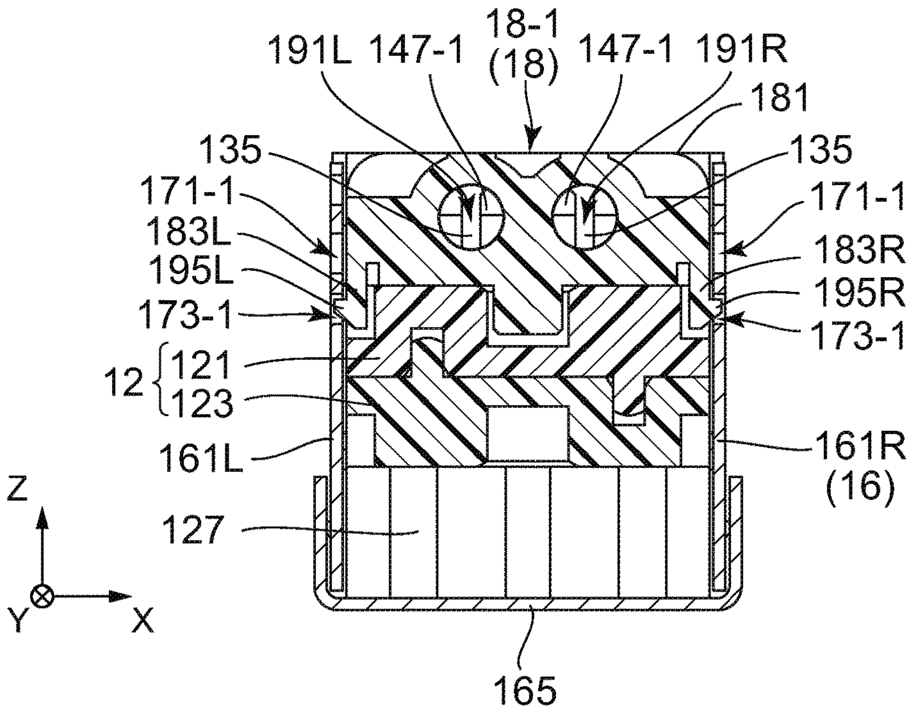
FIG. 13 is another longitudinal sectional view showing the main portion of FIG. 10. The cutting position is same as that in FIG. 12. Each of the locators is positioned at a second position.
Figure 16:
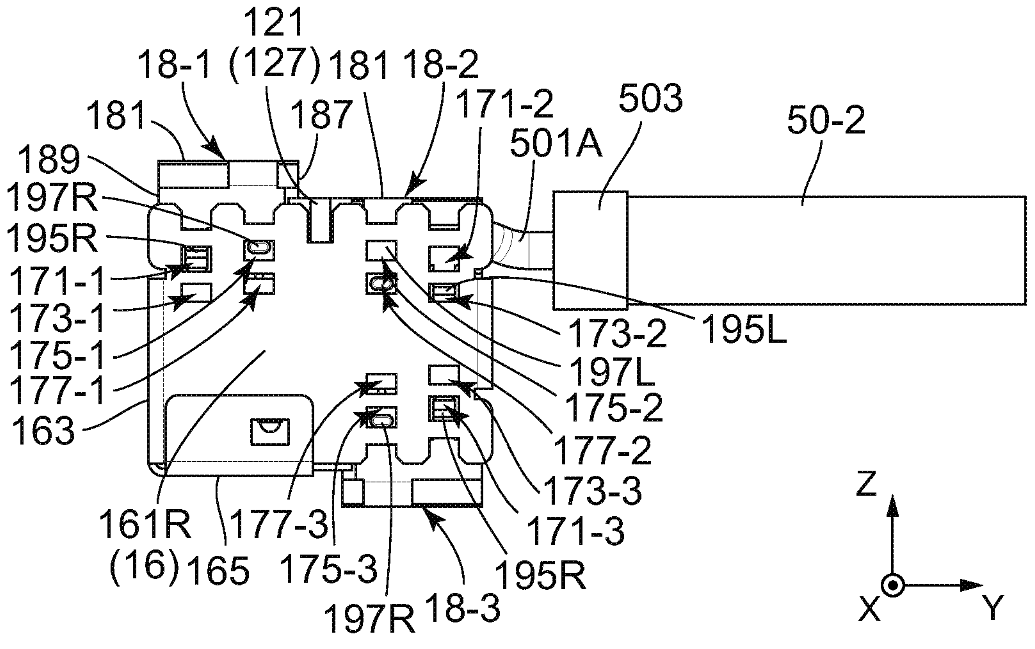
FIG. 16 is another side view showing the main portion and the cable of FIG. 14. The second locator is positioned at the second position.

As understood from a comparison between FIG. 12 and FIG. 13 or between FIG. 15 and FIG. 16, upon further pushing the second locator 18-2 positioned at the first position into the accommodation portion 167, the protrusions 195, i.e. 195R and 195L, come out from the first holes 171-2 and go towards the second holes 173-2, and the auxiliary protrusions 197, i.e. 197R and 197L, come out from the third holes 175-2 and go towards the fourth holes 177-2. Then, upon reaching the second holes 173-2, the protrusions 195 enter the second holes 173-2. In addition, upon reaching the fourth holes 177-2, the auxiliary protrusions 197 enter the fourth holes 177-2. In this description, a position of the locator 18 with respect to the shell 16 is referred to as a second position when the protrusions 195 are positioned in the second holes 173 while the auxiliary protrusions 197 are positioned in the fourth holes 177. In other words, in the present embodiment, when the locator 18 is positioned at the second position, each of the protrusions 195 is positioned in the second hole 173 corresponding to the locator 18 while each of the auxiliary protrusions 197 is positioned in the fourth hole 177. As mentioned above, the locator 18 is attached to the shell 16 so that the locator 18 is movable from the first position to the second position in the first direction. In addition, when each of the protrusions 195 is positioned in the second hole 173 of the shell sidewall portion 161R or 161L corresponding thereto, movement of the locator 18 from the second position to the first position is regulated by the protrusions 195 and the second holes 173.

Figure 18:
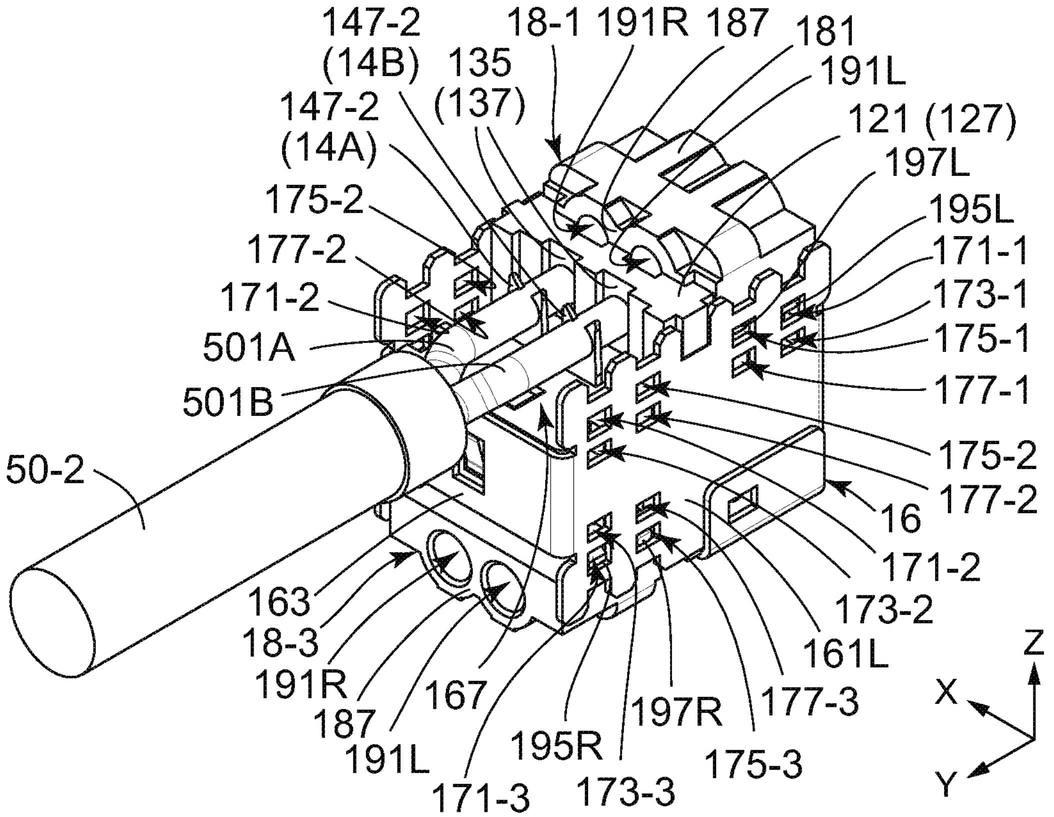
FIG. 18 is a perspective view showing the main portion and the cable of FIG. 16. The second locator is removed.

Referring to FIG. 13, when the locator 18 is positioned at the second position, a range occupied by the receiving hole 191, i.e. 191R or 191L, overlaps with a range occupied by the receiving surface 135 in the first direction. At this time, the connection portion 147 is partly visible in the receiving hole 191. This means that the connection portions 147 correspond to the locator 18 are partly located in the receiving holes 191. With this structure, the electric wires 501 can be connected to the connection portions 147 as shown in FIG. 18 by inserting, into the receiving holes 191 of the locator 18 positioned at the first position, the end portions of the electric wires 501 corresponding thereto and then by moving the locator 18 from the first position to the second position.

Figure 19:
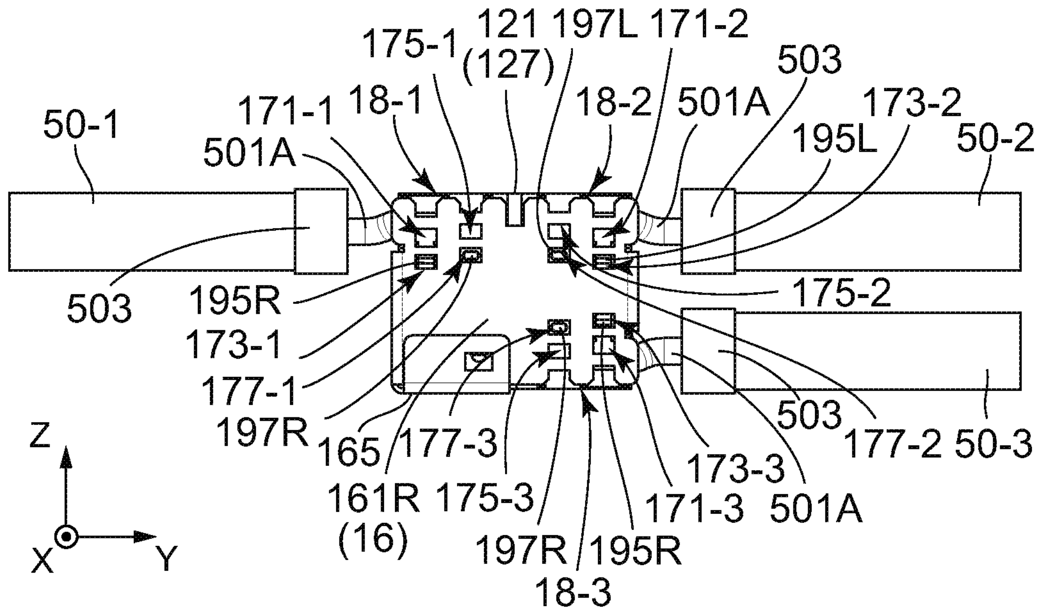
FIG. 19 is a perspective, side view showing an assembly of the main portion of FIG. 16 and the cables. Each of the locators is positioned at the second position.

As shown in FIG. 19, when the cables 50-1, 50-2 and 50-3 are attached to the connector 10, the locators 18-1, 18-2 and 18-3 are positioned at the second positions, respectively.

Figure 20:
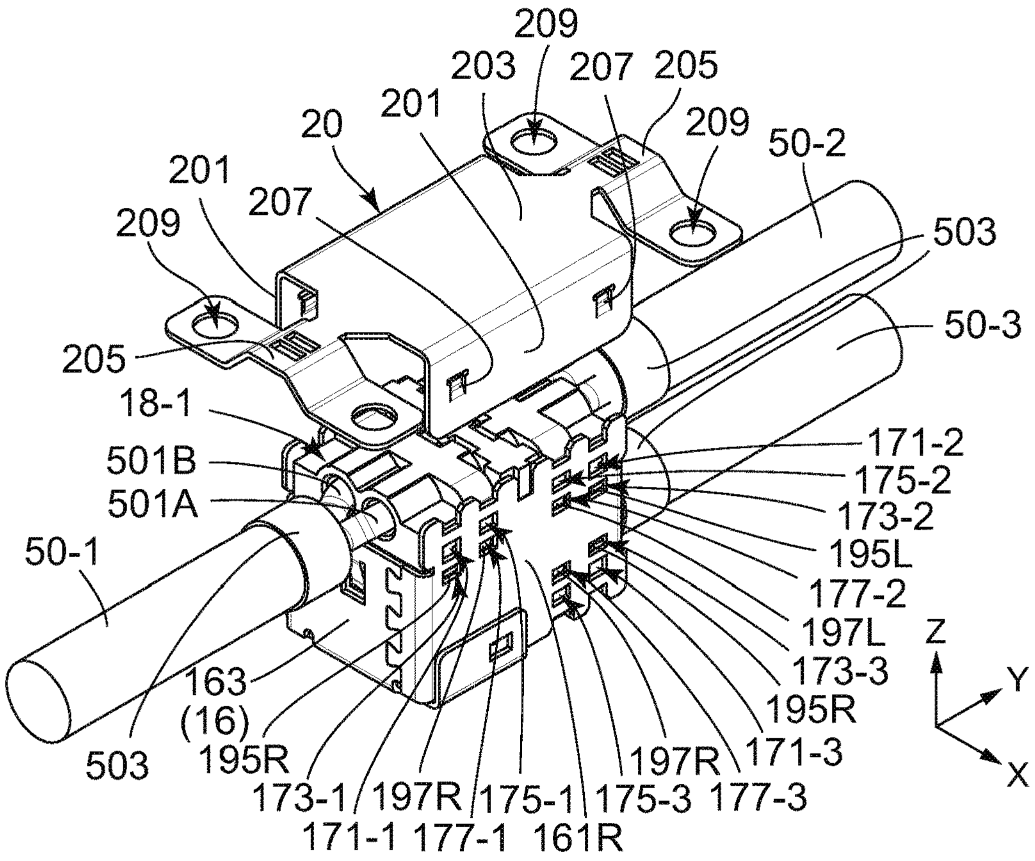
FIG. 20 is a perspective view showing the assembly of FIG. 19 and an upper cover. The upper cover is not attached to the shell.

Referring to FIG. 20, the coupling portion 203 of the upper cover portion 20 has an approximately rectangular shape and a size which allows the coupling portion 203 to cover the shell 16 when viewed along the up-down direction. The cover sidewall portions 201 have approximately rectangular shapes long in the front-rear direction and extend downward in the up-down direction from both edges of the coupling portion 203. Each of the cover sidewall portions of 201 has spring pieces 207 protruding inward in the width direction. In the present embodiment, each of the cover sidewall portions 201 has two spring pieces 207. The spring pieces 207 respectively correspond to the first holes 171-1 and 171-2, which correspond to the first locator 18-1 and the second locator 18-2, of the shell 16. The attaching portions 205 adjoin a front portion and a rear portion of the coupling portion 203, respectively. Each of the attaching portions 205 is formed with screw holes 209 piercing it in the up-down direction.

Figure 21:
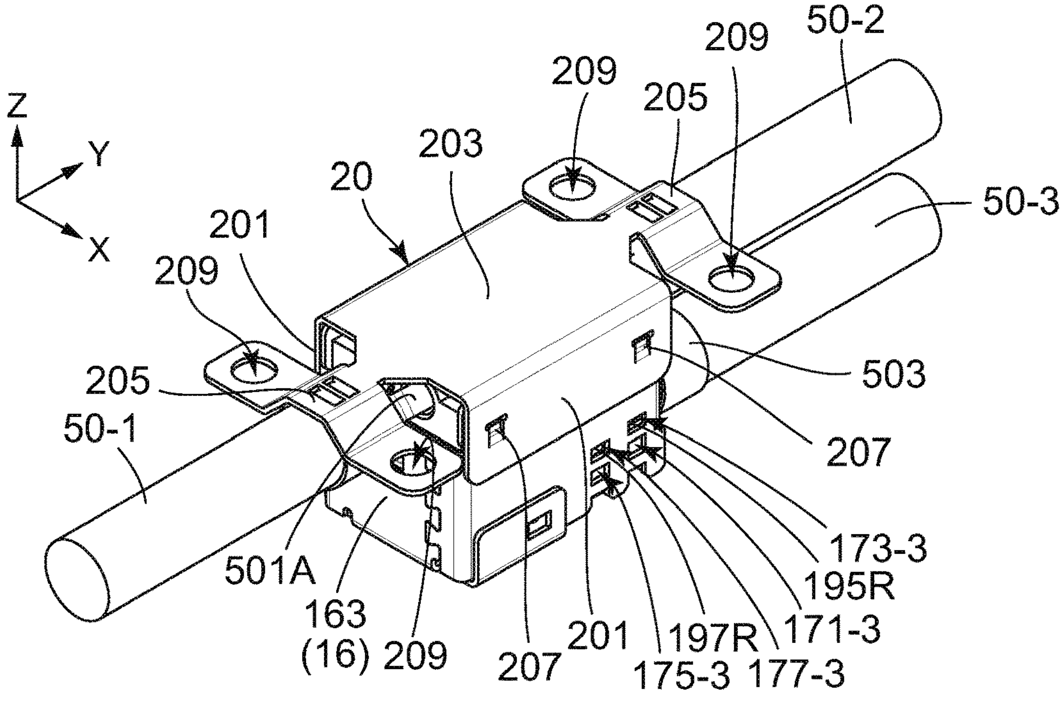
FIG. 21 is a perspective view showing the assembly and the upper cover of FIG. 20. The upper cover is attached to the shell.

As understood from FIGS. 20 and 21, the upper cover portion 20 is attached to the shell 16 in a state that the first locator 18-1 and the second locator 18-2 are positioned at the second positions. In a state that the upper cover portion 20 is attached to the shell 16, the cover sidewall portions 201 are positioned outward of the shell sidewall portions 161R and 161L in the width direction. Each of the spring pieces 207 is positioned in the first hole 171 corresponding thereto when the upper cover portion 20 is attached to the shell 16. When at least one of the first locator 18-1 and the second locator 18-2 is positioned at the first position, any or all of the spring pieces 207 cannot enter the first holes 171 corresponding thereto. Accordingly, the upper cover portion 20 cannot be attached to the shell 16.

Figure 22:
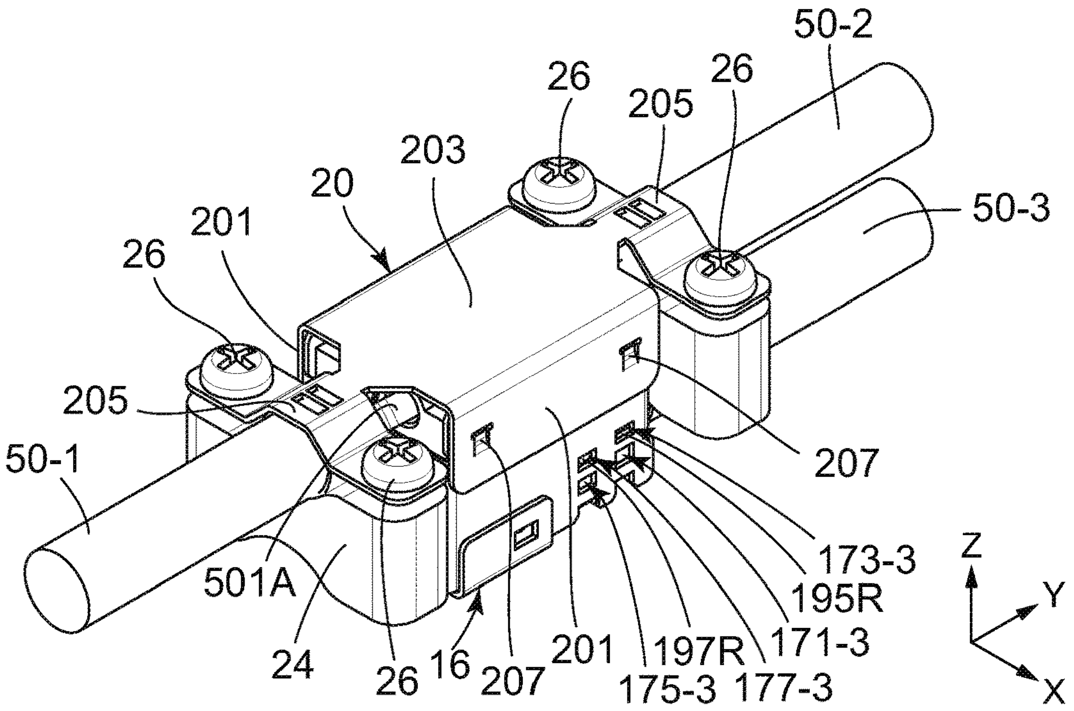
FIG. 22 is a perspective view showing the assembly and the upper cover of FIG. 21 and fixing blocks. The upper cover is fixed to the fixing blocks with screws.

As shown in FIG. 22, the upper cover portion 20 is fixed to the fixing blocks 24 with the screws 26. The cables 50-1 and 50-2 are sandwiched and fixed between the attaching portions 205 and the fixing blocks 24, respectively. Thus, the electric wires 501 of the cables 50-1 and 50-2 are prevented from coming off from the connector 10. Moreover, the shielding conductors 503 of the cables 50 are electrically connected to the upper cover portion 20 so that an electromagnetic shield effect is improved.

Figure 23:
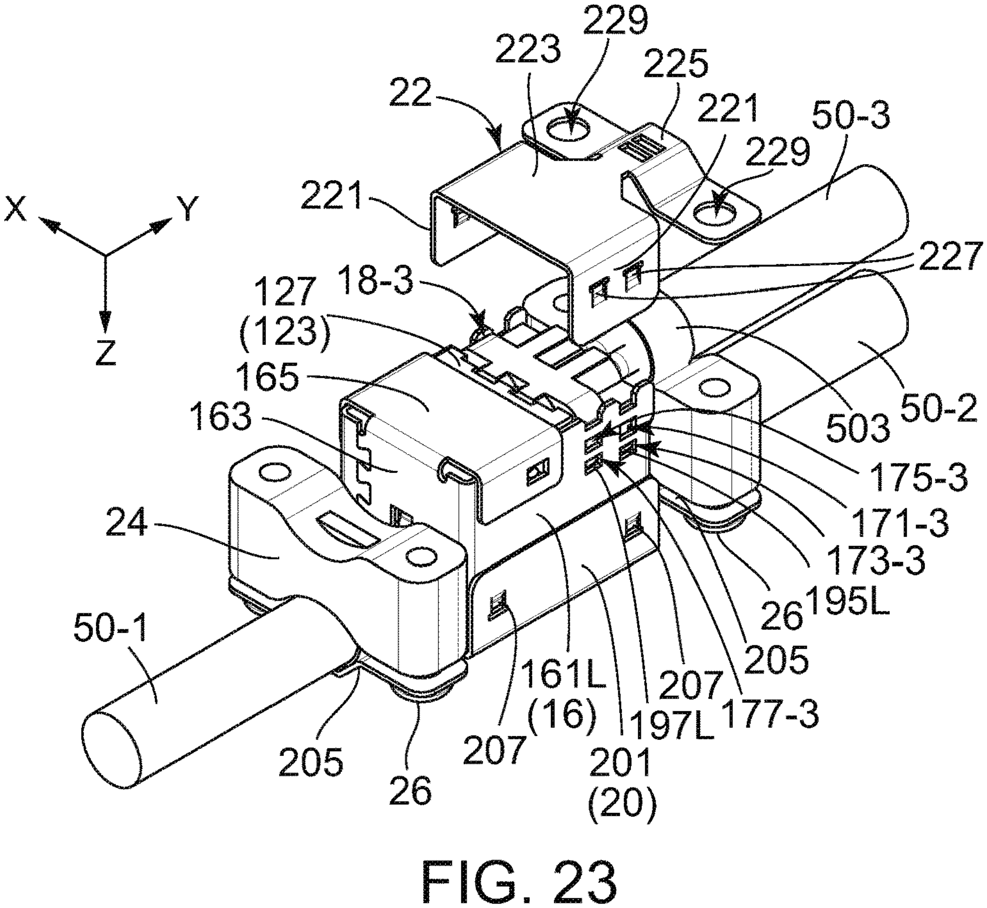
FIG. 23 is a perspective view showing the assembly of FIG. 22 and a lower cover. The lower cover is not attached to the shell.

Referring to FIG. 23, the lower cover portion 22 has the two cover sidewall portions 221, the coupling portion 223 and an attaching portion 225. The lower cover portion 22 is made of metal. When viewed along the up-down direction, the coupling portion 223 has an approximately rectangular shape and a size which covers a half of the shell 16. The cover sidewall portions 221 extend upward in the up-down direction from both edges of the coupling portion 223. Each of the cover sidewall portions 221 has spring pieces 227 protruding inward in the width direction. In the present embodiment, each of the cover sidewall portions 221 has two spring pieces 227. The spring pieces 227 respectively correspond to the first hole 171-3 and the third hole 175-3, which correspond to the third locator 18-3, of the shell 16. The attaching portion 225 adjoins a rear portion of the coupling portion 223. The attaching portion 225 is formed with screw holes 229 piercing it in the up-down direction.

Figure 24:
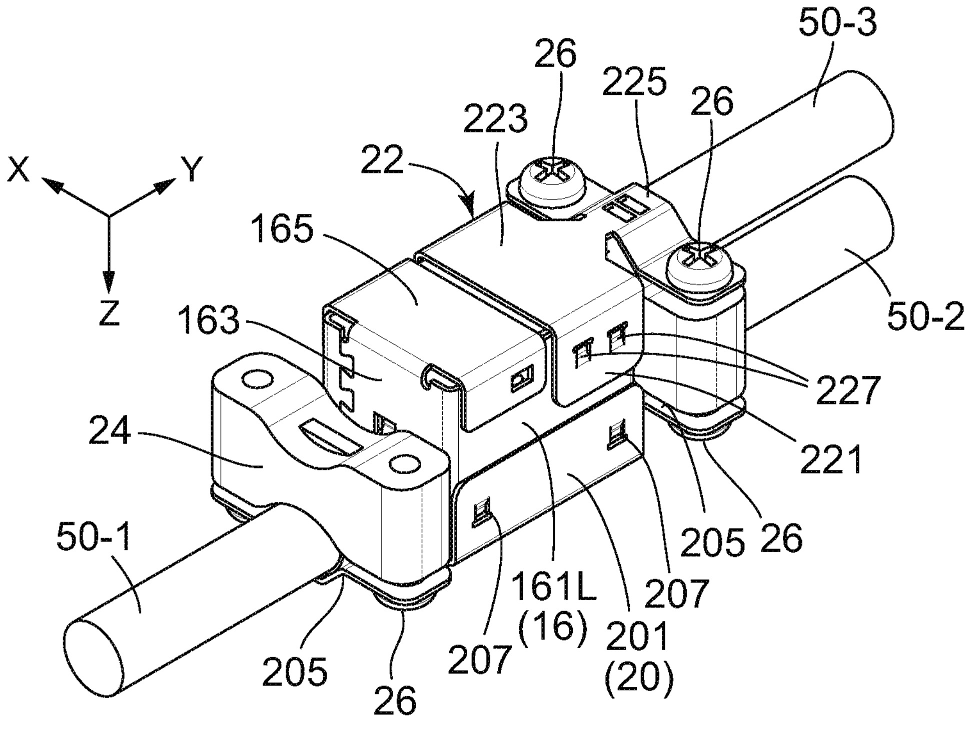
FIG. 24 is a perspective view showing the assembly and the lower cover of FIG. 23. The lower cover is attached to the shell and fixed to the fixing block with screws.

As understood from FIGS. 23 and 24, the lower cover portion 22 is attached to the shell 16 in a state that the third locator 18-3 is positioned at the second position. In a state that the lower cover portion 22 is attached to the shell 16, the cover sidewall portions 221 are positioned outward of the shell sidewall portions 161R and 161L in the width direction. When the lower cover portion 22 is attached to the shell 16, the spring pieces 227 are respectively positioned in the first hole 171-3 and the third hole 175-3 which correspond to them. When the third locator 18-3 is positioned at the first position, the spring pieces 227 cannot enter the first hole 171-3 and the third hole 175-3 corresponding to them. Accordingly, the lower cover portion 22 cannot be attached to the shell 16.

As shown in FIG. 24, the lower cover portion 22 is fixed to one of the fixing blocks 24 with the screws 26. The cable 50-3 is sandwiched between the lower cover portion 22 of the fixing block 24. Thus, the electric wires 501 of the cable 50-3 are prevented from coming off from the connector 10. Moreover, the shielding conductor 503 of the cable 50-3 is electrically connected to the lower cover portion 22, so that an electromagnetic shield effect is improved.

As described above, the use of the connector 10 according to the present embodiment enables mutual connection of the cables 50 with simple operation. The gaps are provided between the first end face 187 of the locator 18 and the receiving surfaces 135 of the housing 12 in the second direction, and the gaps are made visible from outside. Accordingly, connections of the electric wires 501 of the cable 50 to the connector 10 can be surely carried out.

The connector 10 according to the present embodiment can be used as a branch connector which divides a transmission line, a signal transmission path or a power supply line into two. Here, a conventional branch connector takes a form of hanging a branch line from a main line. Accordingly, it is necessary to secure some length of the main line previously. Therefore, a problem that the main line is too long or too short may be caused. In contrast to this, a branch device having three connection portions, like that of the present invention, can extend the main line whenever a branch line is connected. In addition, the branch device allows a long main line to be cut and used. Even in that case, it is hard to cause a useless part of the main line.

Second Embodiment

Figure 25:
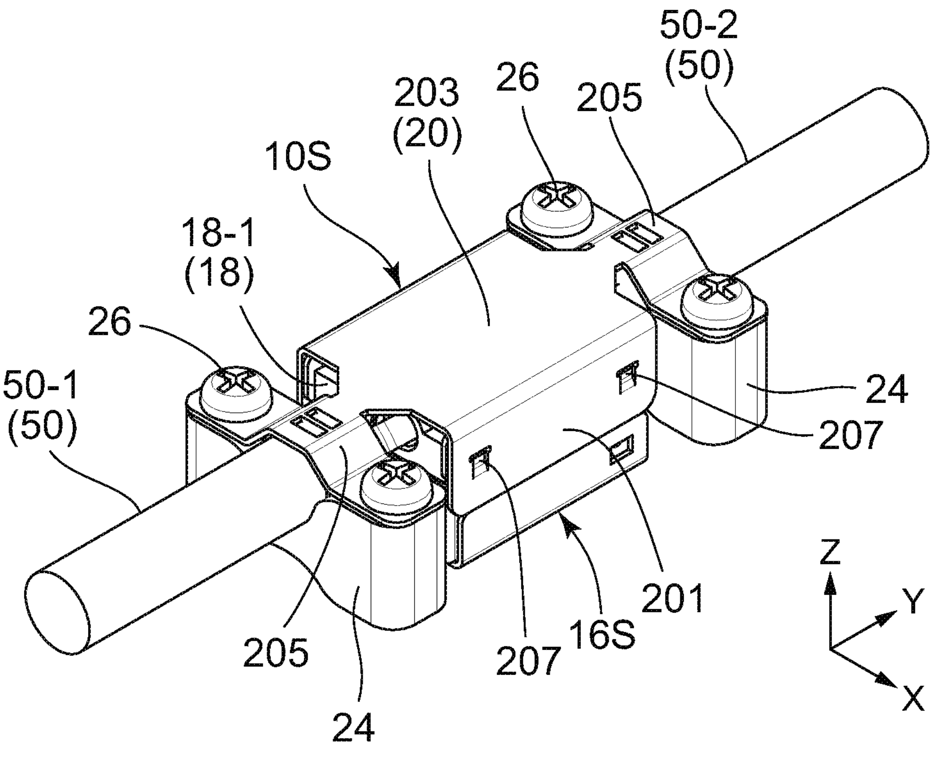
FIG. 25 is a perspective view showing an assembly of a connector according to a second embodiment of the present invention and cables. The connector connects two cables to each other.

Referring to FIG. 25, a connector 10S according to a second embodiment of the present invention connects two cables 50, i.e. 50-1 and 50-2, to each other.

Figure 26:
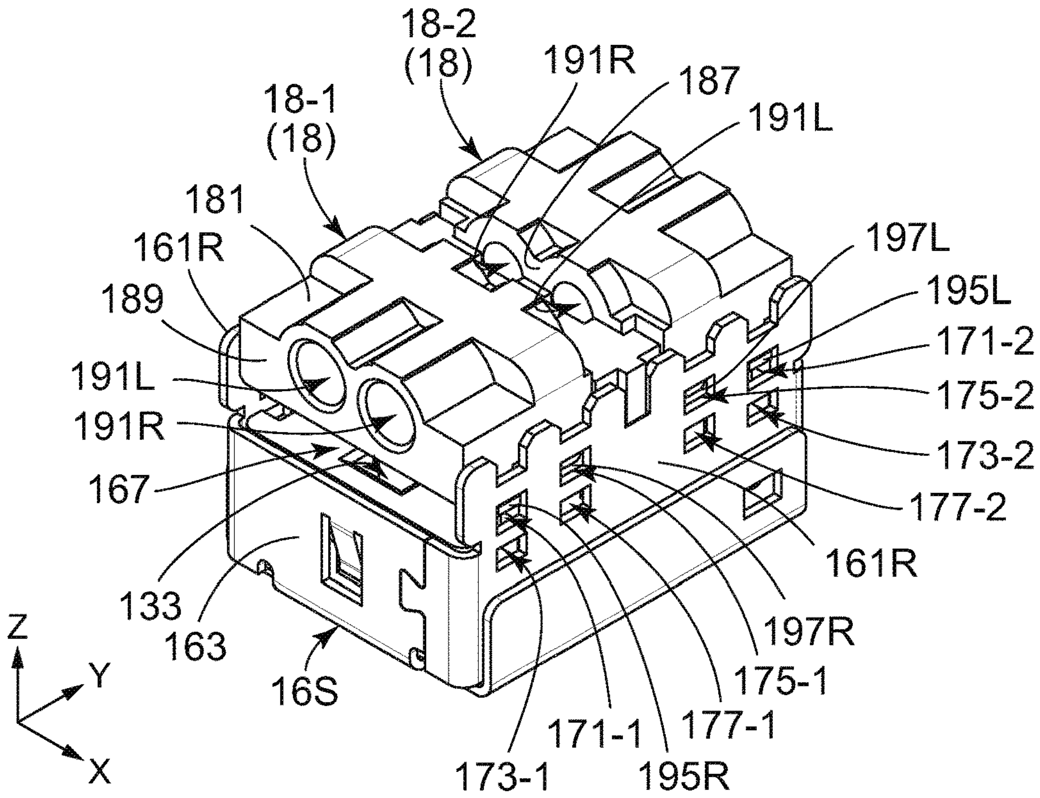
FIG. 26 is a perspective view showing a main portion of the connector of FIG. 25. Each of locators is positioned at a first position.
Figure 27:
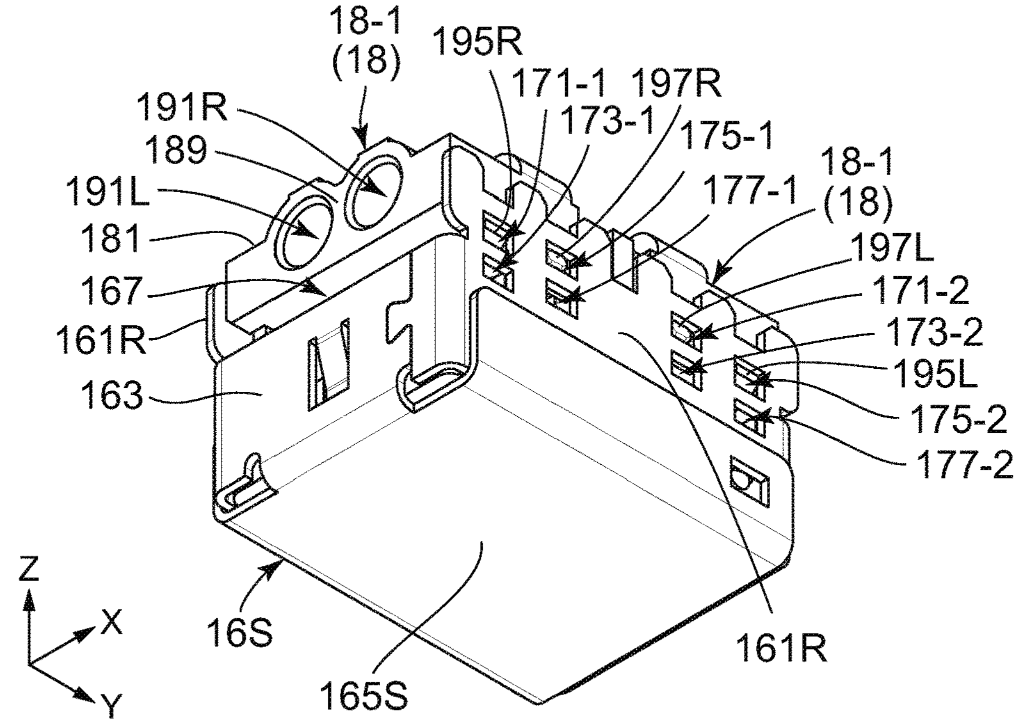
FIG. 27 is another perspective view showing the main portion of FIG. 26.

As understood from FIGS. 26 and 27, the connector 10S of the present embodiment is almost same as the connector 10 of the first embodiment, except that the third locator 18-3 and its related components are removed.

As shown in FIGS. 26 and 27, a shell 16S is smaller than the shell 16 in size in the first direction and has a bottom plate portion 165S covering a bottom portion of the connector 10S. In the present embodiment, each of terminals (not shown) is same as the terminal 14 (see FIG. 5), except that the third connection portion 147-3 is removed.

The connector 10S according to the present embodiment can connect the two cables 50 to each other with easy operation. For example, the connector 10S can be used as an extension connector for extending a transmission line, a signal transmission path or a power supply line.

Third Embodiment

Figure 28:
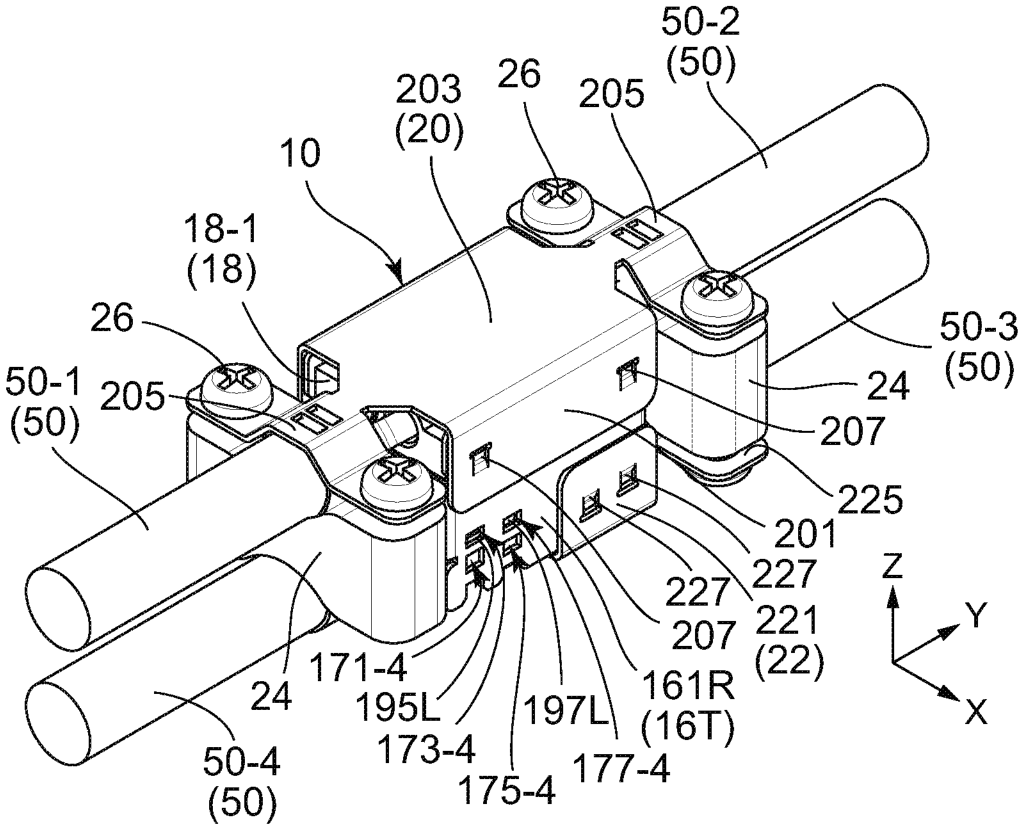
FIG. 28 is a perspective view showing an assembly of a connector according to a third embodiment of the present invention and cables. The connector connects four cables to one another.

Referring to FIG. 28, a connector 10T according to a third embodiment of the present invention connects four cables 50, i.e. 50-1, 50-2, 50-3 and 50-4, to each other.

Figure 29:
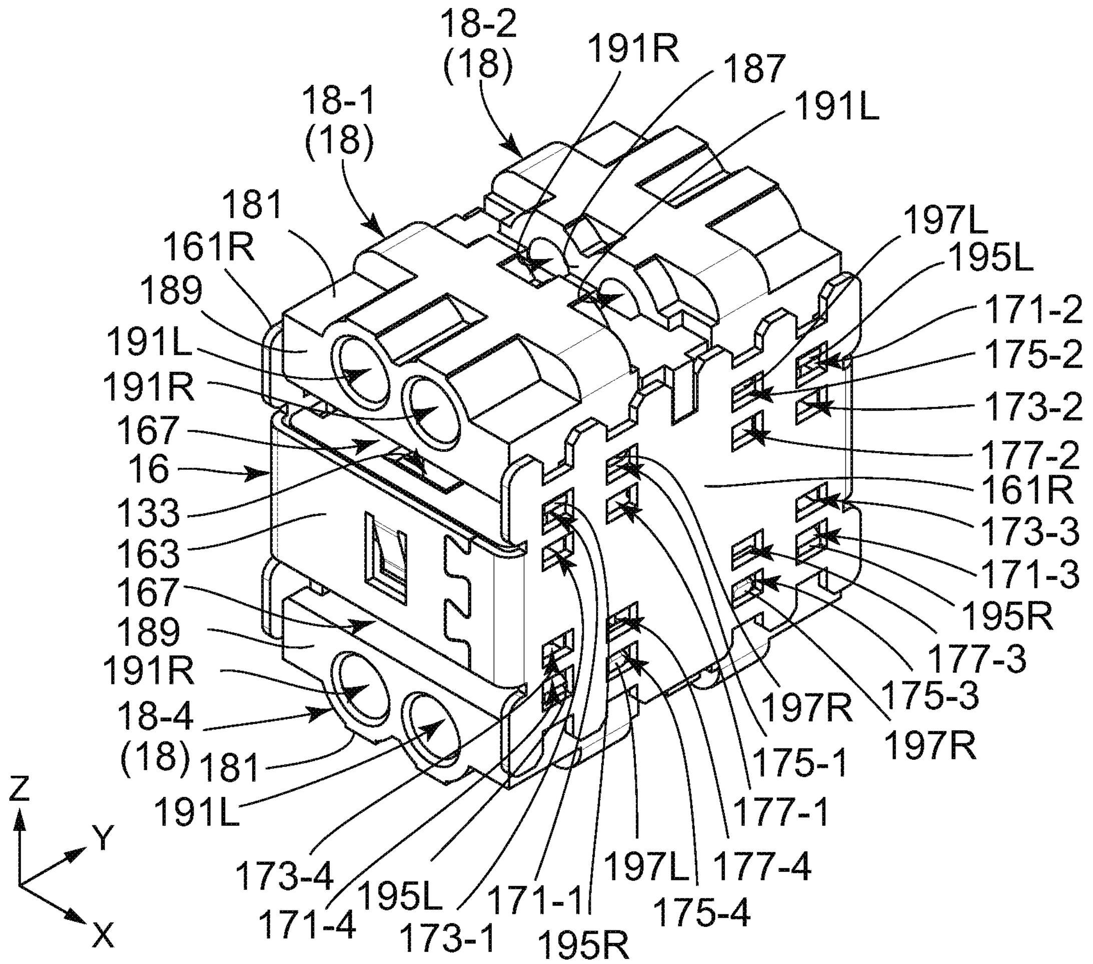
FIG. 29 is a perspective view showing a main portion of the connector of FIG. 28. Each of locators is positioned at a first position.
Figure 30:
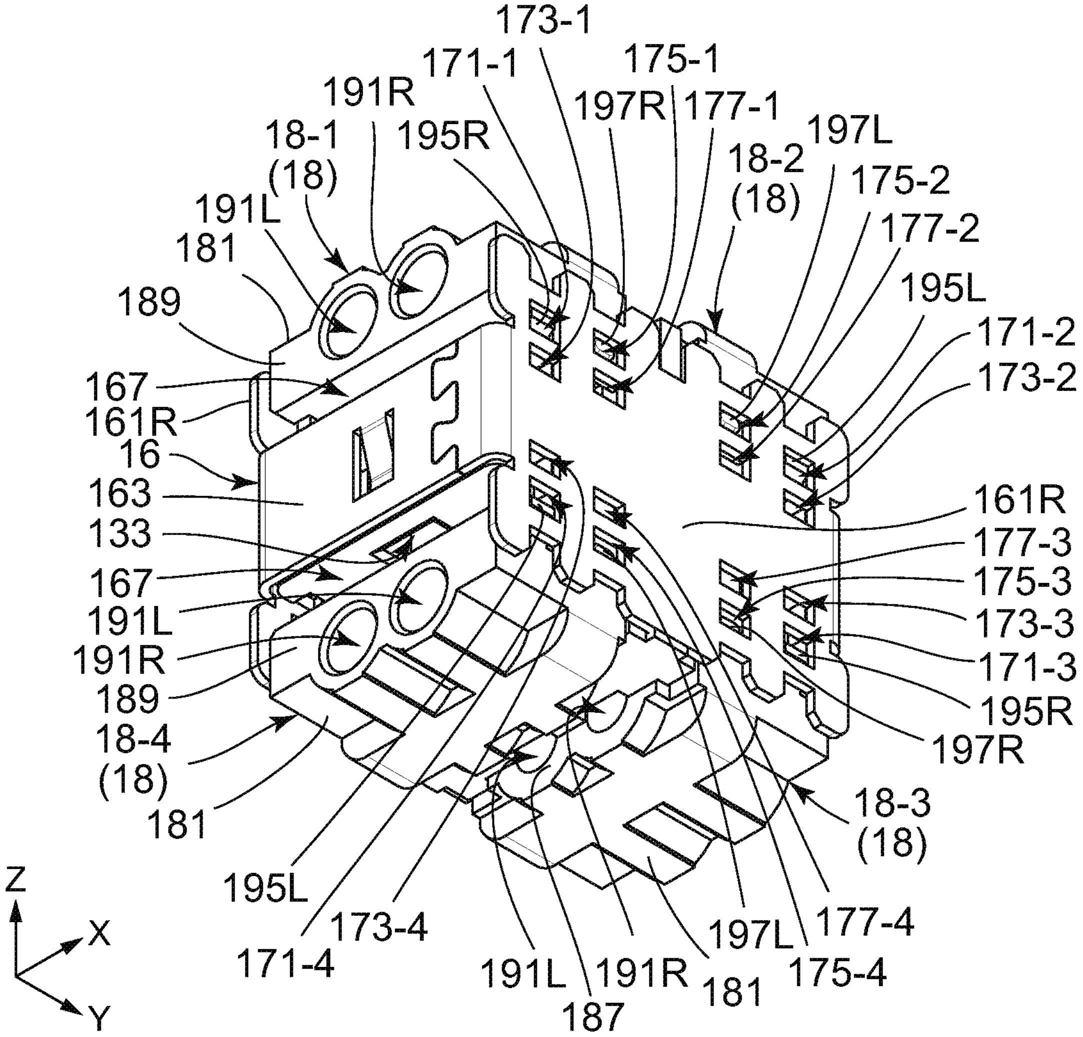
FIG. 30 is another perspective view showing the main portion FIG. 29.
Figure 31:
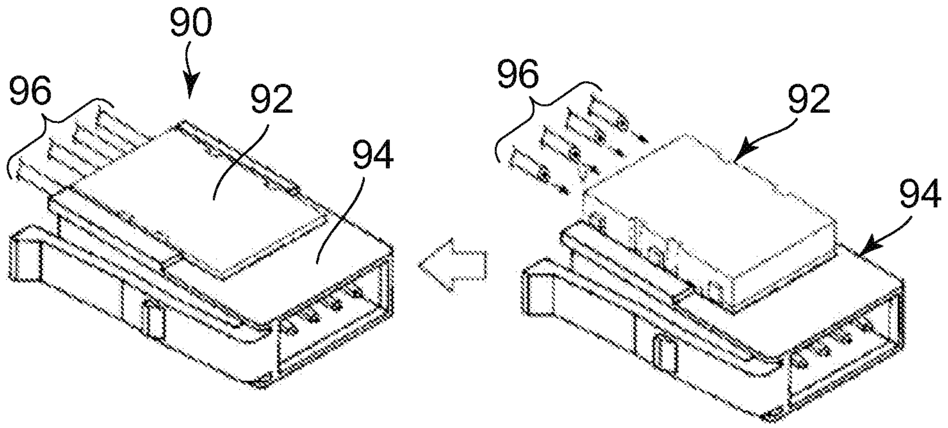
FIG. 31 PRIOR ART
FIG. 31 is a figure showing an insulation displacement connection connector disclosed in Patent Document 1.

As understood from FIGS. 29 and 30, the connector 10T of the present embodiment is almost same as the connector 10 according to the first embodiment, except that a fourth locator 18-4 is added. In the present embodiment, the fourth locator 18-4 is formed so that it is same as the first locator 18-1.

As understood from FIGS. 29 and 30, each of shell sidewall portions 161R and 161L of a shell 16T is formed with a first hole 171-4, a second hole 173-4, a third hole 175-4 and a fourth hole 177-4 which correspond to the fourth locator 18-4. In the present embodiment, each of terminals (not shown) is same as the terminal 14 (see FIG. 5), except that the terminal is provided with a fourth connection portion, which extends in a direction opposite to that of the first connection portion 147-1 and faces the third connection portion 147-3. The fourth connection portion and the third connection portion 147-3 are positioned so that their projections are identical with each other in the second direction. The fourth connection portion and the first connection portion 147-1 have shapes symmetrical to each other in the first direction.

The connector 10T according to the present embodiment can connect the four cables 50 to each other with easy operation. In a manner similar to the case of the first embodiment, the connector 10T can be used as a branch connector which divides a transmission line, a signal transmission path or a power supply line into three.

Although the specific explanation about the present invention is made above with reference to the embodiments, the present invention is not limited thereto but susceptible of various modifications and alternative forms without departing from the spirit of the invention. For example, although all the electric wires 501 are connected to the connection portions 147 corresponding to them by insulation displacement connection in each of the aforementioned embodiments, a part of the electric wires 501 may be soldered to a terminal(s) or screwed to a terminal block.

Although the number of the cables 50 is equal to the number of the connection portions 147 of the terminal 14 in each of the aforementioned embodiments, a connector of the present invention may be provided with a plurality of terminals each of which has connection portions 147 fewer in number than the cables 50. For example, a connector of the present invention may be a connector which is connected to four cables and provided with two sets of terminals each of which connects two cables to each other.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector which connects cables to each other, wherein:

the connector comprises a housing, at least one terminal, a shell and at least one locator;

each of the cables comprises at least one electric wire;

the terminal has at least two connection portions;

the connection portions are respectively connected to the electric wires of the cables;

the shell has two shell sidewall portions which are apart from each other in a width direction;

each of shell sidewall portions is provided with at least one set of a first hole and a second hole corresponding to the locator;

the first hole and the second hole of the one set pierce the shell sidewall portion in the width direction and are apart from each other in a first direction perpendicular to the width direction;

the locator is attached to the shell so that the locator is movable from a first position to a second position in the first direction;

the locator corresponds to at least one of the cables and to the connection portion connected to the electric wire of the cable corresponding thereto;

the locator is provided with a first end face, a second end face, a receiving hole, an admitting portion and two protrusions;

the first end face and the second end face are located at both ends of the locator in a second direction, which is perpendicular to the width direction and intersects with the first direction;

the receiving hole pierces the locator from the second end face to the first end face and is receivable an end of the electric wire of the cable corresponding to the locator;

the admitting portion communicates with the receiving hole and allows the connection portion corresponding to the locator to be moved when the locator is moved;

the protrusions correspond to the shell sidewall portions, respectively;

each of the protrusions protrudes outward in the width direction;

when the locator is positioned at the first position, each of the protrusions is positioned in the first hole corresponding to the locator; and when the locator is positioned at the second position, each of the protrusions is positioned in the second hole corresponding to the locator, and the connection portion corresponding to the locator is in the receiving hole in part.

2. The connector as recited in claim 1, wherein:

the at least one locator comprises two or more locators; and the locators correspond to the connection portions, respectively.

3. The connector as recited in claim 1, wherein:

the at least one locator comprises three or more locators;

the at least two connection portions of the terminal comprise three or more connection portions; and the locators correspond to the connection portions, respectively.

4. The connector as recited in claim 1; wherein:

each of the cables is a twisted pair cable comprising two electric wires;

the connector comprises two terminals as the at least one terminal;

the terminals correspond to the two electric wires, respectively; and the two terminals have shapes symmetrical to each other.

5. The connector as recited in claim 1, wherein each of the connection portions comprises an insulation displacement connection piece having a bifurcate shape and extending in the first direction.

6. The connector as recited in claim 1, wherein:

the locator has a main portion and two support portions extending from the main portion in the first direction;

the receiving hole is provided in the main portion;

the support portions are resiliently deformable and correspond to the protrusions, respectively;

each of the protrusions is supported by the support portion corresponding thereto and is movable at least in the width direction; and when each of the protrusions is positioned in the second hole of the shell sidewall portion corresponding thereto, movement of the locator from the second position toward the first position is regulated.

7. The connector as recited in claim 1, wherein:

the housing has at least one receiving surface intersecting with the second direction;

the receiving surface of the housing and the shell sidewall portions form an accommodation portion which accommodates the locator;

when the locator is positioned at the second position, a region occupied by the receiving hole included in a region occupied by the receiving surface in the first direction; and when the locator is positioned at the first position, a part of the region occupied by the receiving hole is included in the region occupied by the receiving surface in the first direction while a remaining part of the region occupied by the receiving hole is out of the region occupied by the receiving surface in the first direction.

8. The connector as recited in claim 1, wherein:

the housing has at least one receiving surface intersecting with the second direction;

the receiving surface of the housing and the shell sidewall portions form an accommodation portion which accommodates the locator;

the first end face of the locator is nearer to the receiving surface of the housing than to the second end face of the locator in the second direction;

when the locator is positioned at the first position, the end of the electric wire inserted in the receiving hole is possible to be brought into abutment with the receiving surface; and a gap remains between the first end face of the locator and the receiving surface of the housing in the second direction.

9. The connector as recited in claim 1, wherein:

the locator is provided with a guided portion extending in the first direction; and the housing is provided with a guide portion which receives and guides the guided portion.

10. The connector as recited in claim 1, wherein the shell is made of conductive metal.

11. The connector as recited in claim 1, wherein:

the connector further has a cover portion;

the cover portion is made of metal;

the cover portion comprises two cover sidewall portions which are apart from each other in the width direction and a coupling portion which connects the cover sidewall portions to each other;

each of the cover sidewall portions has a spring piece protruding inward in the width direction;

in a state that the locator is positioned at the second position, the cover portion is attached to the shell; and in a state that the cover portion is attached to the shell, the cover sidewall portions are positioned outward of the shell sidewall portions while the spring piece is positioned in the first hole.

12. The connector as recited in claim 11, wherein:

the cable comprises a shielding conductor; and the cover portion is connected to the shielding conductor.

* * * * *